(12) United States Patent
Maeda et al.

(10) Patent No.: US 11,242,273 B2
(45) Date of Patent: Feb. 8, 2022

(54) ION REMOVAL DEVICE

(71) Applicant: Panasonic Intellectual Property Management Co., Ltd., Osaka (JP)

(72) Inventors: Yasunari Maeda, Osaka (JP); Tomohiro Akita, Osaka (JP); Ayane Kihara, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 242 days.

(21) Appl. No.: 16/488,592

(22) PCT Filed: Feb. 28, 2018

(86) PCT No.: PCT/JP2018/007553
§ 371 (c)(1),
(2) Date: Aug. 25, 2019

(87) PCT Pub. No.: WO2018/159693
PCT Pub. Date: Sep. 7, 2018

(65) Prior Publication Data
US 2021/0221722 A1  Jul. 22, 2021

(30) Foreign Application Priority Data

Feb. 28, 2017  (JP) .............................. JP2017-037503
Jul. 20, 2017  (JP) .............................. JP2017-141115
Nov. 30, 2017  (JP) .............................. JP2017-230768

(51) Int. Cl.
*C02F 5/02* (2006.01)
*C02F 1/28* (2006.01)
(Continued)

(52) U.S. Cl.
CPC ................. *C02F 5/02* (2013.01); *C02F 1/28* (2013.01); *C02F 1/68* (2013.01); *C02F 2101/10* (2013.01); *C02F 2303/16* (2013.01)

(58) Field of Classification Search
None
See application file for complete search history.

(56) References Cited

U.S. PATENT DOCUMENTS 2,256,421 A * 9/1941 Borchardt .................. F25J 3/04
62/649
2002/0185005 A1* 12/2002 Deng .................. B01D 53/047
95/96

FOREIGN PATENT DOCUMENTS

AU    2010357340 A1    1/2012
EP     1008561 A2      6/2000
(Continued)

OTHER PUBLICATIONS

Decision of Refusal for corresponding Japanese Patent Application No. 2019-503070 dated Dec. 8, 2020, with English language translation.
(Continued)

*Primary Examiner* — Chester T Barry
(74) *Attorney, Agent, or Firm* — Renner, Otto, Boisselle & Sklar, LLP

(57) ABSTRACT

An ion removal device includes a hard water storage section configured to store hard water; and a fine bubble generation means configured to generate fine bubbles and supply the bubbles to the hard water storage section, wherein, in the hard water storage section, metal ions in the hard water are adsorbed to the fine bubbles to be removed from the hard water.

21 Claims, 14 Drawing Sheets

(51) Int. Cl.
*C02F 1/68* (2006.01)
*C02F 101/10* (2006.01)

(56) References Cited

FOREIGN PATENT DOCUMENTS

| | | |
|---|---|---|
| JP | 2000-140840 A | 5/2000 |
| JP | 2009131737 A | 6/2009 |
| JP | 2011-161407 A | 8/2011 |
| JP | 2014-076421 A | 5/2014 |
| JP | 2014076421 A | 5/2014 |
| JP | 2016-117051 A | 6/2016 |
| JP | 2017-072122 A | 4/2017 |
| WO | 2012/008013 A1 | 1/2012 |

OTHER PUBLICATIONS

English language translation of the International Report on Patentability for corresponding Application No. PCT/JP2018/007553, dated May 1, 2018.
International Search Report for corresponding Application No. PCT/JP2018/007553, dated May 1, 2018.
Matsumoto Masakazu, et al., "The Application of Micro-Bubbles for Dissolution and Crystallization of Calcium Carbonate in Gas-Liquid-Solid System", Bull. Soc. Sea Water Sci. Jpn., 2004, 58, pp. 475-486, in particular, abstract, Fig.1, 12, 13,4, conclusion.
First Examination Report for Indian Patent Application No. 201917035432 dated Feb. 25, 2020.
European Search report for corresponding EP Application No. 18761909.3, dated Feb. 6, 2020.
Office Action for corresponding Chinese Patent Application No. 201880014142.X dated Jun. 2, 2021 with English language translation.

* cited by examiner

ION REMOVAL DEVICE

TECHNICAL FIELD

The present invention relates to an ion removal device.

BACKGROUND ART

Conventionally, there have been disclosed ion removal devices for removing metal ions in hard water (e.g. see Patent Document 1).

An ion removal device in Patent Document 1 is intended to remove metal ions (calcium ion and magnesium ion) in hard water using an ion exchange resin. Specifically, metal ions are removed from hard water in such a way that metal ions in hard water is replaced with sodium ions by making hard water flow through a treatment tank containing an ion exchange resin having a surface attached with sodium ions. Thereby, a hardness of hard water is decreased to produce soft water. The metal ions which have been contained in hard water are captured on the surface of the ion exchange resin.

PRIOR ART DOCUMENTS

Patent Document

Patent Document 1: Japanese Patent Laid-Open Publication No. 2000-140840

SUMMARY OF THE INVENTION

Problems to be Solved by the Invention

However, the ion removal device in Patent Document 1 requires a large amount of salt water for reproducing the ion exchange resin which has captured the metal ions, and has a problem of troublesome maintenance. In addition, there is a problem that the regeneration treatment causes regeneration waste water containing a large amount of salt water, resulting in increases in soil pollution and burden of sewage treatment. Furthermore, the treated water softened by the ion removal device has a high concentration of sodium ions, and may not be recommended as drinking water in certain areas.

As described above, the ion removal device using the ion exchange resin had a room for improvement from the viewpoints of maintainability and environmental property.

Thus, an object of the present invention is to solve the aforementioned problems, and to provide an ion removal device having better maintainability and environmental property.

Means for Solving the Problems

In order to achieve the above objects, the ion removal device according to the present invention includes a hard water storage section configured to store hard water; and a fine bubble generation means configured to generate fine bubbles and supplying the bubbles to the hard water storage section, wherein, in the hard water storage section, metal ions in the hard water are adsorbed to the fine bubbles to be removed from the hard water.

Effects of the Invention

According to the present invention, an ion removal device having better maintainability and environmental property can be provided.

MODES FOR CARRYING OUT THE INVENTION

As a result of intensive investigations, the inventors of the present invention have found information that removal of metal ions can be enhanced by using "fine bubbles" which have never been used in ion removal technologies for removing metal ions from hard water (water-softening technologies), and this finding has led to the invention of the embodiment. In particular, the inventors have found that the effect of removing metal ions can be further enhanced by changing a type of a gas as a generating source for the fine bubbles.

Hereinafter, embodiments 1 to 3 according to the present invention will be explained in detail with reference to the figures.

Embodiment 1

Figure 1:
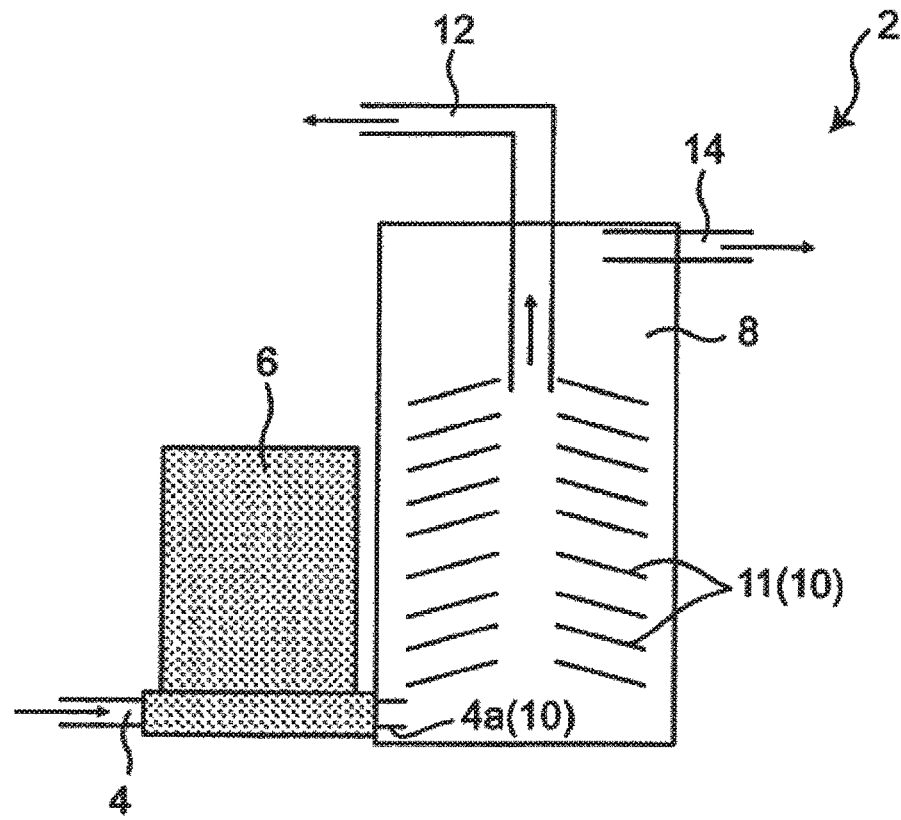
FIG. 1 presents a schematic drawing of an ion removal device according to embodiment 1.

FIG. 1 presents a schematic configuration of an ion removal device 2 according to embodiment 1.

<Overall Configuration>

The ion removal device 2 refers to a device for removing metal ions from hard water. The metal ions herein refer to calcium ions ($Ca^{2+}$) and magnesium ions ($Mg^{2+}$). The ion removal device 2 according to embodiment 1 refers to a water-softening device for producing soft water by removing and separating metal ions from hard water to decrease a metal ion concentration (hardness) in hard water down to a predetermined concentration or lower.

As shown in FIG. 1, the ion removal device 2 according to embodiment 1 includes a hard water supply pipe 4, a fine bubble generation means 6, a treatment tank 8, a separation means 10, a soft water drawing pipe 12, and a separated water discharging pipe 14.

The hard water supply pipe 4 refers to a pipe for supplying hard water. The hard water supply pipe 4 is an example of a hard water supply means for supplying hard water. Also, the hard water supply pipe 4 refers to a hard water storage section for storing hard water.

The fine bubble generation means 6 refers to a means for generating fine bubbles. The fine bubbles refer to bubbles having diameters of 100 μm or smaller. The fine bubbles include micro-bubbles (having diameters of e.g. 1 to 100 μm) and nano-bubbles (having diameters of e.g. smaller than 1 μm). The micro-bubbles may be bubbles of which the diameters can be recognized as micro-order sizes by those skilled in the water treatment art, and the nano-bubbles may be bubbles of which the diameters can be recognized as nano-order sizes by those skilled in the water treatment art. The fine bubbles have different properties from normal bubbles in points of a long retention time in water, difficulty in combination with other bubbles due to difficulty in increasing the diameter as a single bubble, a tendency to chemically react due to a large contact area, and the like.

Incidentally, the fine bubbles may include a small ratio of bubbles having diameters of 100 μm or larger (such as milli-bubbles). For example, bubbles including 90% or more of bubbles having diameters of 100 μm or smaller may be defined as fine bubbles. In addition, a condition of 50% or more of bubbles having diameters of 60 μm or smaller, a condition of 5% or more of bubbles having 20 μm or smaller, and the like may be added. When measuring the diameters of the bubbles (bubble diameters), for example, the treatment tank 8 may be directly photographed with a high-speed camera to calculate the bubble diameters by a three-point method in image processing, or otherwise the bubble diameters may be measured by another method. A timing of measuring the bubble diameters may be optionally selected as long as the bubbles remain in the hard water storage section. An example of the conditions for the aforementioned measuring method using the high-speed cameras is described as follows.

High-speed camera: FASTCAM 1024 PCI (PHOTRON LIMITED.)

Lens system: Z16 APO (Leica Camera AG), Objective lens: Planapo 2.0× (Leica Camera AG)

Photographing speed: 1000 fps

Shutter speed: 1/505000 sec

Image area: 1024×1024 pixel (micro-bubble photographing area: 1.42 mm×1.42 mm, milli-bubble photographing area: 5.69 mm×5.69 mm)

Image processing software: Image-Pro Plus (Media Cybermetics, Inc.)

The fine bubble generation means 6 according to embodiment 1 refers to a device formed adjacent to the hard water supply pipe 4 and capable of directly supplying the generated fine bubbles to the hard water supply pipe 4.

The fine bubble generation means 6 according to embodiment 1 has a function of generating fine bubbles originating from one gas selected from a plural types of gases. The fine bubble generation means 6 can generate fine bubbles e.g. originating from a fine bubble generating source selected from two gases, air and carbon dioxide.

In the water-softening treatment for softening water by supplying fine bubbles to hard water, the ion removal device 2 according to embodiment 1 generates fine bubbles originating from "air" to supply the bubbles to the hard water supply pipe 4. Furthermore, in the regeneration treatment after the water-softening treatment, fine bubbles are generated originating from not air but "carbon dioxide" to supply the bubbles to the hard water supply pipe 4.

Although the specific principle will be described later, fine air bubbles are supplied to hard water, so that metal ions in hard water can be adsorbed to the fine bubbles, and the adsorbed metal ions can be crystallized and precipitated as metal components to remove the metal ions from hard water.

The treatment tank 8 refers to a tank for further treating hard water to which the fine bubbles are supplied. Like the aforementioned hard water supply pipe 4, the treatment tank 8 is a hard water storage section for storing hard water. The treatment tank 8 is connected to a distal end of the hard water supply pipe 4. The treatment tank 8 includes the separation means 10 (end portion 4a and adsorption plates 11), the soft water drawing pipe 12, and the separated water discharging pipe 14.

The separation means 10 refers to a means for separating the crystallized and precipitated metal components from hard water. The separation means 10 according to embodiment 1 is composed of the end portion 4a of the hard water supply pipe 4 and a plurality of adsorption plates 11.

The end portion 4a of the hard water supply pipe 4 is connected to an outer peripheral portion of the treatment tank 8 and is disposed so as to discharge water in a direction eccentric from the central axis of the treatment tank 8. Such an eccentric arrangement makes it possible to generate a swirling flow in the liquid discharged to the treatment layer 8. The formation of the swirling flow makes it possible to move the metal components having larger specific gravities outward from the central axis in the treatment tank 8 to centrifuge the metal components.

The adsorption plates 11 refers to plates having a function of adsorbing the crystallized and precipitated metal components.

The soft water drawing pipe 12 refers to a member for drawing soft water having a hardness decreased to a predetermined value or lower by treatment in the treatment tank 8. The soft water drawing pipe 12 is an example of a soft water drawing means for drawing soft water. As the definitions of hard water and soft water, for example, the WHO definition may be used. That is, water having a hardness of lower than 120 mg/L may be defined as soft water, and water having a hardness of 120 mg/L or higher may be defined as hard water.

As shown in FIG. 1, an upstream end portion of the soft water drawing pipe 12 is located at a position substantially overlapping the central axis of the treatment tank 8, so as to suck up water in the treatment tank 8. Such an arrangement allows the soft water drawing pipe 12 to draw the treated water (e.g. soft water) containing no metal component, centrifuged by the swirling flow.

The separated water discharging pipe 14 refers to a member for discharging the separated water containing the condensed metal components crystallized from the metal ions. The separated water discharging pipe 14 is an example of the separated water discharging means for discharging the separated water. The separated water discharging pipe 14 is connected to the outer peripheral portion of the treatment tank 8 at the upper end portion of the treatment tank 8. Such an arrangement allows the separated water discharging pipe 14 to draw separated water containing the metal components centrifuged by the swirling flow.

<Water-Softening Treatment>

In such a configuration, the fine bubble generation means 6 generates fine bubbles originating from "air" and supplies the fine air bubbles to hard water to soften water.

It is predicted that once the fine air bubbles are supplied to the hard water supply pipe 4, the actions as described in the following sections (1) and (2) are caused on the metal ions in hard water. Specifically, it is predicted that the metal ions can be removed from hard water by adsorbing the metal ions in hard water to the fine bubbles and crystallizing the adsorbed metal ions. Specifically, the process is as follows Note that the present invention is not necessarily restricted to the specific principle described in the following sections (1) and (2).

(1) Metal Ion Adsorption

Figure 2:
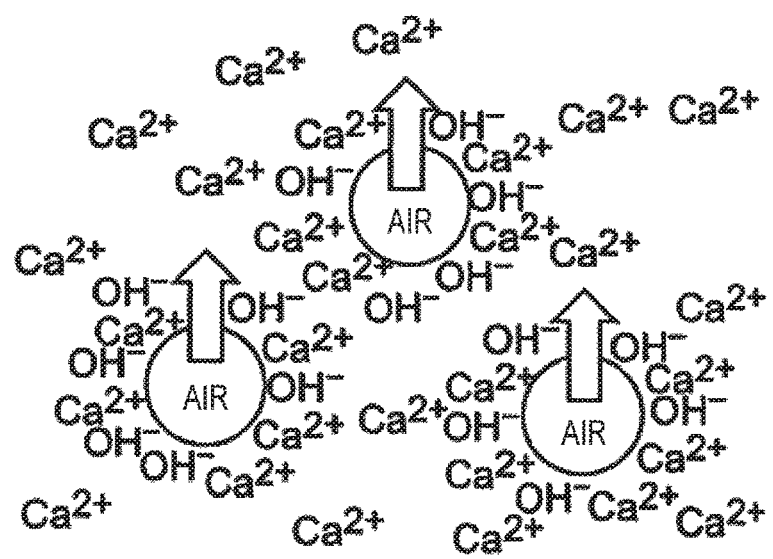
FIG. 2 presents a schematic drawing for explaining a hypothetical principle of metal ion adsorption with the ion removal device according to embodiment 1.

As shown in FIG. 2, once fine air bubbles are supplied to hard water, $H^+$ (hydrogen ions) and $OH^-$ (hydroxide ions) are mixed on the surfaces of the fine bubbles, $H^+$ is positively charged, and $OH^-$ is negatively charged (only $OH^-$ is shown in FIG. 2). On the other hand, hard water contains $Ca^{2+}$ and $Mg^{2+}$ as positively-charged metal ions. In the following explanation, $Ca^{2+}$ will be taken as an example of the metal ion.

The positively charged $Ca^{2+}$ is adsorbed to $OH^-$ on the surfaces of the fine bubbles by an intermolecular force action (interionic interaction). In this manner, $Ca^{2+}$ can be adsorbed to the fine bubbles. Incidentally, although the surfaces of the fine bubbles have $H^+$ which repels $Ca^{2+}$, it is considered that $OH^-$ acts preferentially to $H^+$ and adsorbs $Ca^{2+}$.

(2) Metal Ion Crystallization

Figure 3:
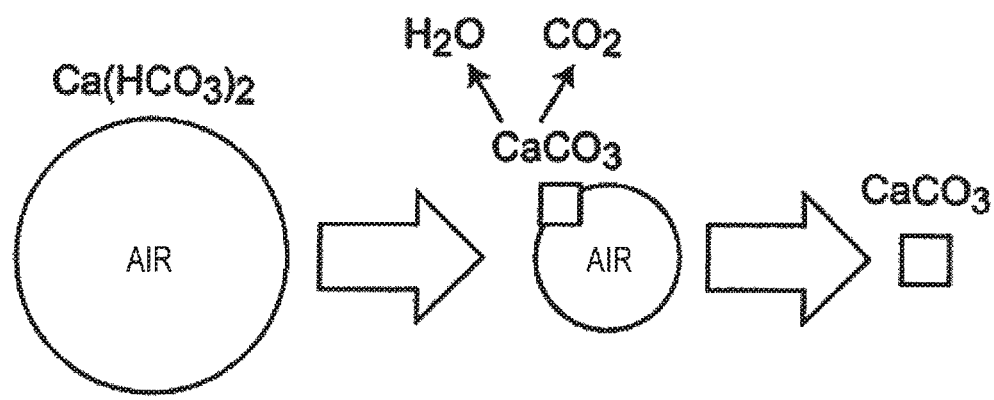
FIG. 3 presents a schematic drawing for explaining a hypothetical principle of metal ion crystallization with the ion removal device according to embodiment 1.

In addition to the reaction shown in FIG. 2, the supply of the fine air bubbles to hard water enhances the reaction shown in FIG. 3. Specifically, unlike normal bubbles, the fine air bubbles supplied to hard water are difficult to rise up, and dissolve in hard water, and therefore gradually contract by an increased surface tension as shown in FIG. 3. As described above, $Ca^{2+}$ is adsorbed to the surface of the fine bubbles. More specifically, $Ca^{2+}$ exists as a calcium ion of a soluble $Ca(HCO_3)_2$ (calcium bicarbonate). Herein, as the fine bubbles gradually contract, a concentration of the dissolved $Ca^{2+}$ on the surfaces of the fine bubbles increases. Because of the increase in the concentration of the dissolved $Ca^{2+}$, the $Ca^{2+}$ becomes supersaturated at some point, and then crystallizes and precipitates. For representing this reaction by a specific chemical formula, the formula is as the following Formula 1.

$$Ca(HCO_3)_2 \rightarrow CaCO_3 + CO_2 + H_2O \quad \text{(Formula 1)}$$

Since $CaCO_3$ (calcium carbonate) is insoluble (water insoluble), $CaCO_3$ precipitates as a crystal. Thereby, the $Ca^{2+}$ dissolved as $Ca^{2+}$ of $Ca(HCO_3)_2$ precipitates as a crystal. The metal ion $Ca^{2+}$ can be removed from hard water by enhancing such a reaction.

Incidentally, although a reaction reverse to the reaction of Formula 1 may also occur in the same water, the reaction in the direction of Formula 1 is predicted to preferentially occur in the equilibrium relation by continuously supplying the fine bubbles.

Subsequently, water including the fine bubbles is discharged from the end portion 4a of the hard water supply pipe 4 in a direction eccentric from the central axis of the treatment tank 8 to generate a swirling flow in a circumferential direction. Subsequently, the treated water rises up turning in the circumferential direction by continuously discharging the treated water from the end portion 4a. The reactions "(1) metal ion adsorption" and "(2) metal ion crystallization" are caused in the hard water supply pipe 4 and the treatment tank 8. That is, the reactions are caused in a hard water storage section for storing hard water.

As described above, the plurality of adsorption plates 11 are disposed inside of the treatment tank 8. Thus, the crystallized and precipitated $CaCO_3$ described in the section "(2) Metal Ion Crystallization" is adsorbed to the adsorption plates 11 on the way of centrifugation by the swirling flow. Thereby, the metal component resulting from $Ca^{2+}$ can be separated and removed.

On the other hand, the remaining $CaCO_3$ which has never been adsorbed to the adsorption plates 11 is moved further outward in the treatment tank 8. Subsequently, from the discharging section 14 disposed on the upper end portion of the treatment tank 8, the remaining $CaCO_3$ contained in the separated water is discharged to the outside.

Water softened by separating metal ions and metal components is drawn from the soft water drawing pipe 12. In this manner, hard water can be softened.

<Regeneration Treatment>

The water-softening treatment allows the crystallized and precipitated $CaCO_3$ to adhere to the adsorption plates 11 and the inner wall of the treatment tank 8. As a treatment for returning this $CaCO_3$ to $Ca(HCO_3)_2$, a regeneration treatment is carried out. Specifically, the fine bubble generation means 6 generates fine bubbles originating from a gas different from the gas used in the water-softening treatment to supply the fine bubbles to the hard water supply pipe 4.

In the fine bubble generation means 6 according to embodiment 1, "carbon dioxide" is used as a gas for the regeneration treatment.

Figure 4:
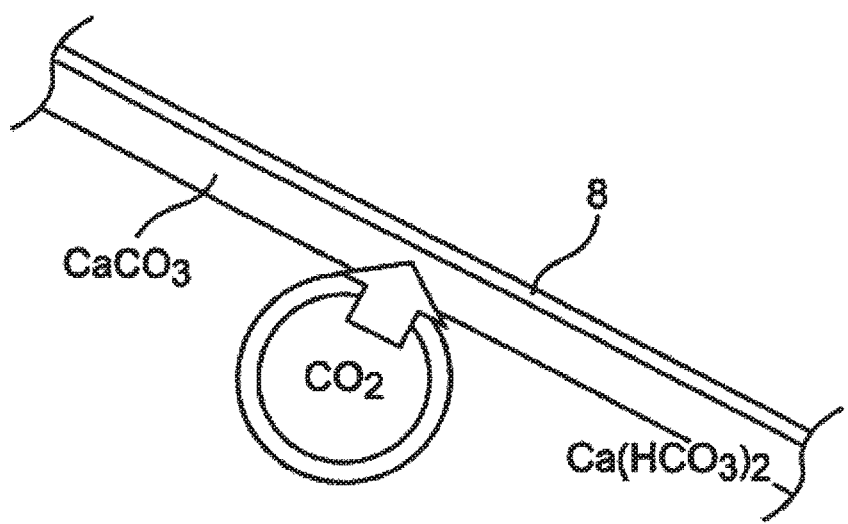
FIG. 4 presents a schematic drawing for explaining a hypothetical principle of regeneration treatment with the ion removal device according to embodiment 1.

As shown in FIG. 4, fine carbon dioxide bubbles are supplied to $CaCO_3$ adhering to the inner wall of the treatment tank 8 and the adsorption plates 11 to enhance the following reaction.

$$CaCO_3 + CO_2 + H_2O \rightarrow Ca(HCO_3)_2 \quad \text{(Formula 2)}$$

This reaction produces soluble (water soluble) $Ca(HCO_3)_2$ from insoluble $CaCO_3$. $Ca(HCO_3)_2$ dissolves into water and is discharged from the separated water discharging pipe 14 as described above. Thereby, the insoluble $CaCO_3$ in the treatment tank 8 can be discharged to the outside to regain the original state. Subsequently, the aforementioned water-softening treatment can be implemented again.

In the above explanation, although $Ca^{2+}$ was taken as an example of the metal ion, the same reaction is predicted to occur as for $Mg^{2+}$.

As described above, the ion removal device 2 according to embodiment 1 performs the water-softening treatment and the regeneration treatment using the fine bubbles. Particularly, in the water-softening treatment, the fine air bubbles are supplied into hard water, so that the metal ions can be adsorbed to the fine bubbles, and the adsorbed metal ions can be crystallized and precipitated as metal components. Soft water can be produced by separating these metal ions and metal components from hard water.

Since such a method is a treatment using gases of air and carbon dioxide unlike a case using an ion exchange resin, a large amount of salt water or the like for reabsorbing sodium ions as in the case of the ion exchange resin becomes unnecessary. Thereby, the regeneration treatment and maintenance become easy.

In addition, this method is having better environment property because regeneration waste water containing salt water as in the case of the ion exchange resin is not generated, and therefore problems of increases in soil pollution and sewage treatment are resolved.

Furthermore, the treated water is also recommended as drinking water because a high sodium ion concentration in the treated water as in the case of the ion exchange resin is also suppressed.

In this way, it is possible to provide an ion removal device 2 having better maintainability and environmental property.

As described above, the ion removal device 2 according to embodiment 1 includes the treatment tank 8 (hard water storage section) configured to store hard water, and the fine bubble generation means 6 configured to generate fine bubbles and supplying the fine bubbles to the treatment tank 8. The fine bubbles generated by the fine bubble generation means 6 are supplied to the treatment tank 8, so that the metal ions in the hard water are adsorbed to the fine bubbles in the treatment tank 8 to be removed from the hard water. That is, the ion removal method according to embodiment 1 includes a generation step of generating fine bubbles, and a first supply step of supplying the generated fine bubbles to hard water. In the first supply step, the metal ions in the hard water are adsorbed to the fine bubbles to be removed from the hard water.

Such a configuration and method make it possible to provide the ion removal device 2 having better maintainability and environmental property compared to the case using the ion exchange resin.

Furthermore, the ion removal device 2 according to embodiment 1 crystallizes and precipitates the metal ions adsorbed to the fine bubbles (along with contraction of the fine bubbles) in the treatment tank 8. That is, in the ion removal method according to embodiment 1, the metal ions adsorbed to the fine bubbles in the first supply step are crystallized and precipitated (along with contraction of the fine bubbles).

Such a configuration and method make it possible to enhance removal of the metal ions by crystallizing the metal ions in addition to the metal ion adsorption.

Furthermore, the ion removal device 2 according to embodiment 1 further includes the separation means 10 configured to separate the crystallized crystal in the treatment tank 8. That is, the ion removal method according to embodiment 1 further includes a separation step of separating the crystallized and precipitated crystal in the first supply step.

Such a configuration and method make it possible to enhance production of soft water.

Furthermore, the ion removal device 2 according to embodiment 1 allows the fine bubble generation means 6 to incorporate air and generate the fine bubbles in the water-softening treatment. Similarly, in the ion removal method according to embodiment 1, fine bubbles are generated from air in the fine bubble generation step.

Such a configuration and method make it possible to extremely reduce a cost required for generating fine bubbles because of using air.

Furthermore, in the ion removal device 2 according to embodiment 1, after the metal ions are removed from the hard water, the fine bubble generation means 6 supplies the fine carbon dioxide bubbles to the treatment tank 8 for performing the regeneration treatment. Similarly, the ion removal method according to embodiment 1 further includes a regeneration step to perform regeneration treatment by supplying fine carbon dioxide bubbles after the metal ions are removed from the hard water in the first supply step.

Such a configuration and method make it possible to enhance a reaction of producing soluble $Ca(HCO_3)_2$ from insoluble $CaCO_3$ to enhance the regeneration treatment.

Example 1

Next, example 1 in embodiment 1 will be explained.

In example 1, the inventors of the present invention conducted an experiment related to the contents explained in the section <Water-softening Treatment> in embodiment 1. Specifically, the experiment was carried out using a device 20 shown in FIGS. 5A and 5B. As a result, results shown in FIG. 6 were obtained.

Figure 5A:
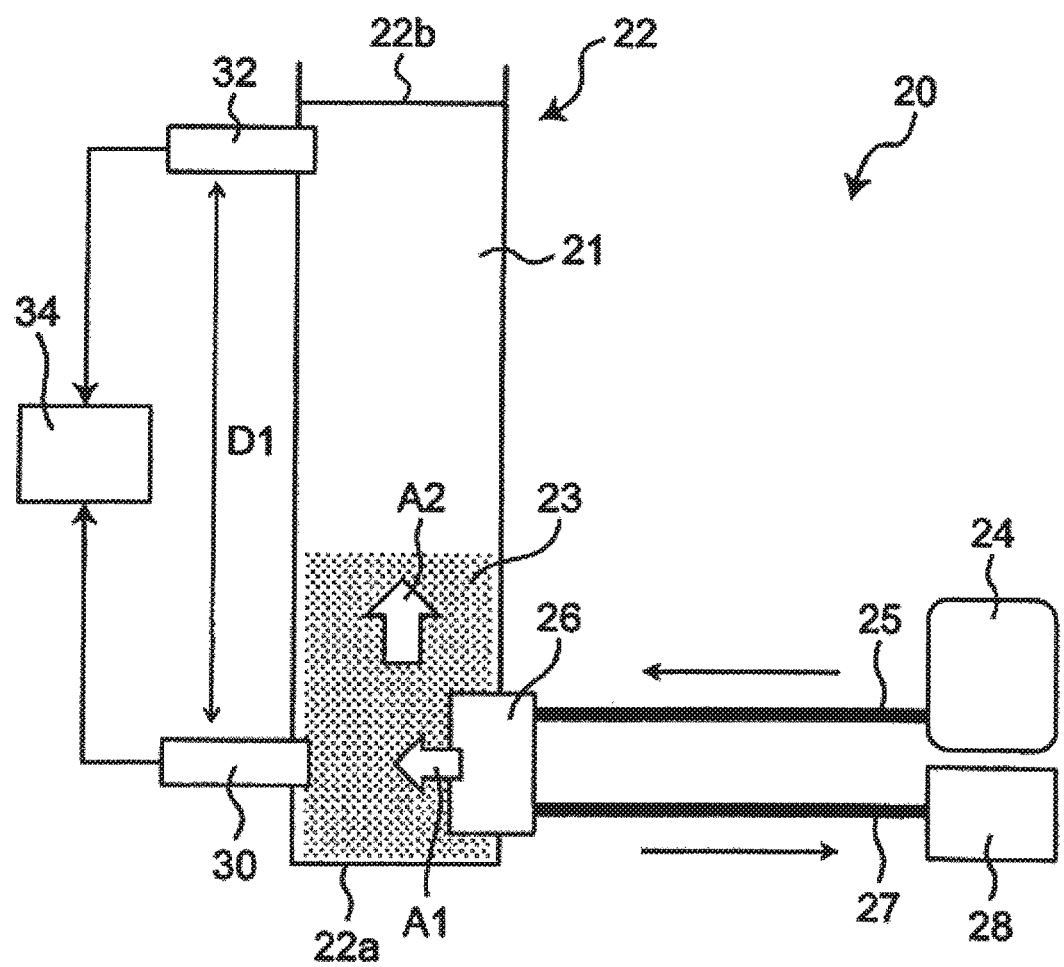
FIG. 5A presents a state a predetermined time after generating fine bubbles according to example 1 in embodiment 1.
Figure 5B:
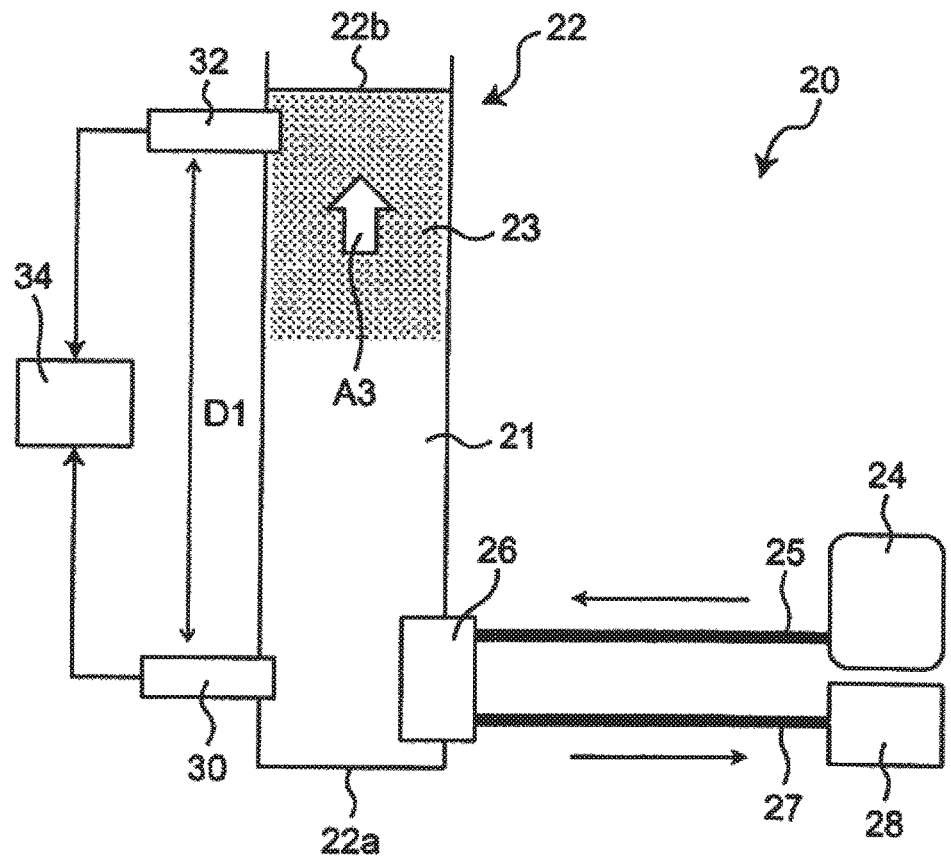
FIG. 5B presents a state further a predetermined time after the state shown in FIG. 5A according to example 1 in embodiment 1.

FIGS. 5A and 5B present schematic configurations of the device 20 used in example 1. FIG. 5A presents a state a predetermined time after generating fine bubbles (specifically, after 15 seconds), and FIG. 5B presents a state further a predetermined time after the state shown in FIG. 5A (specifically, after 45 seconds). The state of FIG. 5A corresponds to a state 15 seconds after generating the fine bubbles in FIG. 6, and the state of FIG. 5B corresponds to a state 60 seconds after generating the fine bubbles in FIG. 6.

The device 20 shown in FIGS. 5A and 5B refers to an experimental device capable of supplying fine bubbles 23 from a bottom face side in a water tank 22 (hard water storage section) for storing a hard water 21. In the device 20, a concentration of the metal ions in the hard water 21 can be measured at two points, the bottom face side and the water surface side. The fine bubbles 23 were supplied into the water tank 22 using this device 20, and results of detecting transitions of the metal ion concentrations at the bottom face side and the water surface side shown in FIG. 6 were obtained.

Figure 6:
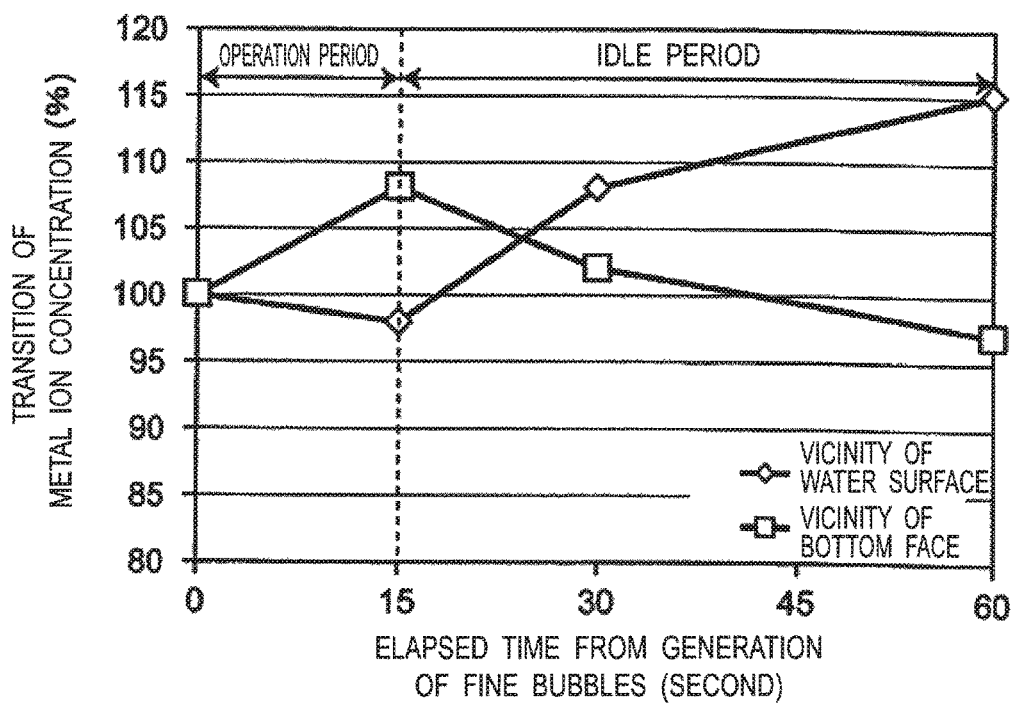
FIG. 6 presents a diagram showing results of example 1 in embodiment 1.

The results shown in FIG. 6 could demonstrate an effect of "metal ion adsorption by fine bubbles" explained in the section <Water-softening Treatment> in embodiment 1. Specific results will be described later.

As shown in FIGS. 5A and 5B, the device 20 includes the water tank 22, a gas supply section 24, a first pipe 25, a fine bubble generation section 26, a second pipe 27, a pump 28, and a first water intake section 30, a second water intake section 32, and a metal ion concentration detector 34.

The water tank 22 refers to a water tank for storing the hard water 21. In the example shown in FIGS. 5A and 5B, the water tank 22 is configured so as to be a vertically long tank. The gas supply section 24 refers to a member for supplying a gas to the fine bubble generation section 26 through the first pipe 25. The fine bubble generation section 26 refers to a device for generating the fine bubbles 23 originating from the gas supplied from the gas supply section 24. The fine bubble generation section 26 corresponds to the aforementioned fine bubble generation means 6 according to embodiment 1. The gas is supplied from the gas supply section 24 to the fine bubble generation section 26 by a negative pressure effect of the pump 28 through the second pipe 27.

The first water intake section 30 refers to a member for taking the sample water of the hard water 21 from a vicinity of a bottom face 22a of the water tank 22. The second water intake section 32 refers to a member for taking the sample water from a vicinity of a water surface 22b of the water tank 22. Height positions of the first water intake section 30 and the second water intake section 32 may be set to any position, and a distance D1 from the first water intake section 30 to the second water intake section 32 can be adjusted to a desired value.

In the examples shown to FIGS. 5A and 5B, the height position of the first water intake section 30 is set to substantially the same position as the height position where the fine bubbles 23 are generated by the fine bubble generation section 26.

The metal ion concentration detector 34 refers to a member for detecting a metal ion concentration in the sample water taken from the first water intake section 30 and the second water intake section 32.

In the above configuration, once the fine bubble generation section 26 and the pump 28 are operated, the gas is sent from the gas supply section 24 to the fine bubble generation section 26 through the first pipe 25 by the negative pressure effect of the pump 28 through the second pipe 27. The fine bubble generation section 26 generates the fine bubbles 23 using this gas as a raw material and supplies the gas to the water tank 22 (arrow A1 in FIG. 5A).

The fine bubbles 26 and the pump 28 are operated for a predetermined period (15 seconds in embodiment 1) to continuously generate the fine bubbles 23.

Subsequently, the operation of the fine bubbles 26 and the pump 28 is terminated. After terminating the operation, a predetermined idle period is provided (45 seconds in embodiment 1).

As shown in FIG. 5A, at the end of the operation period (15 seconds after generation of the fine bubbles), it was visually confirmed that the fine bubbles 23 supplied into the water tank 22 ascended in the hard water 21 (arrow A2) and accumulated in a lower part of the water tank 22.

As shown in FIG. 5B, at the end of the idle period (60 seconds after generation of the fine bubbles), it was visually confirmed that the fine bubbles 23 supplied into the hard water 21 further ascended, reached the water surface 22b (arrow A3), and accumulated in an upper part of the water tank 22.

At a predetermined timing during the operation, the sample water was taken out from the first water intake section 30 and the second water intake section 32, and results of measuring the metal ion concentration by the metal ion concentration detector 34 are shown in FIG. 6.

Specific experimental conditions regarding the results in FIG. 6 will be described below.

(Experimental Condition)
Type of gas supplied by the gas supply section 24: air
Hardness of the hard water 21: about 300 mg/L
Temperature of the hard water 21: 25° C.
Distance D1 from the first water intake section 30 to the second water intake section 32: about 1 m
Operation period of the fine bubble generation section 26 and the pump 28: 15 seconds
Idle period of the fine bubble generation section 26 and the pump 28: 45 seconds
Metal ion concentration detector 34: LAQUA F-70 manufactured by HORIBA, Ltd.
Metal ion to be measured: $Ca^{2+}$
Timing for taking the sample water: 0 seconds, 15 seconds, 30 seconds, and 60 seconds after the start of the operation In FIG. 6, the abscissa represents an elapsed time (seconds) from generation of the fine bubbles, and the ordinate represents a concentration transition (%) of the metal ions ($Ca^{2+}$) detected by the metal ion concentration detector 34. The metal ion concentration transition represents a metal ion concentration transition relative to 100% of the metal ion concentration measured at the start of the operation.

As shown in FIG. 6, after 15 seconds, a concentration of the sample water extracted from the first water intake section 30 in the vicinity of the bottom face 22a of the water tank 22 increases to about 108%. Afterward, the concentration gradually decreases at the idle period and finally decreases to about 97%.

On the other hand, the concentration of the sample water extracted from the second water intake section 32 in the vicinity of the water surface 22b of the water tank 22 is retained at 100% until 15 seconds have passed, then gradually increases at the subsequent idle period, and finally incrementally increases to about 115%.

A result of associating the result of the metal ion concentration transition with the behavior of the fine bubbles 23 is as below.

At the time when 15 seconds have passed, as shown in FIG. 5A, the metal ion concentration increases in the sample water in the first water intake section 30 having the accumulating fine bubbles 23. On the other hand, the metal ion concentration is mostly unchanged in the sample water in the second water intake section 32 having no accumulating fine bubbles 23.

At the time when 60 seconds have passed, as shown in FIG. 5B, the metal ion concentration decreases to just under 100% in the sample water in the first water intake section 30 having no accumulating fine bubbles 23. On the other hand, the metal ion concentration remarkably increases in the sample water in the second water intake section 32 having the accumulating fine bubbles 23.

According to such a result, it is predicted that $Ca^{2+}$ as a metal ion in the hard water 21 is adsorbed by the fine bubbles 23 and ascends as the fine bubbles 23 ascend.

Based on the above prediction, the effect of "metal ion adsorption by fine bubbles" explained in the section <Water-softening Treatment> in embodiment 1 could be demonstrated.

Embodiment 2

The ion removal device according to embodiment 2 of the present invention will be explained. Note that primarily points different from the points in embodiment 1 will be explained in embodiment 2. In embodiment 2, the same or similar constituents as those in embodiment 1 are described with the same reference numerals as in embodiment 1. In embodiment 2, descriptions overlapping those in embodiment 1 are omitted.

Embodiment 2 differs from embodiment 1 in that, as the gas for fine bubbles in the water-softening treatment, not air but nitrogen is used in embodiment 2.

It is predicted that not only the actions of the aforementioned "(1) Metal Ion Adsorption" and "(2) Metal Ion Crystallization" but also the actions as described in the following sections (3) and (4) are enhanced by generating the fine nitrogen bubbles from the fine bubble generation means 6 to supply the bubbles into hard water. Note that the present invention is not necessarily restricted to the specific principle described in the following sections (3) and (4).

(3) Enhancement of Metal Ion Adsorption

As shown in FIG. 7(a), there are charged $H^+$ and $OH^-$ around the fine bubble. As described above, the negatively charged $OH^-$ adsorbs the positively charged $Ca^{2+}$. Under such a circumstance, when nitrogen is used for the fine bubbles, the reaction of the following formula 3 is enhanced.

$$N_2 + 6H^+ + 6e^- \rightarrow 2NH_3$$

$$NH_3 + H_2O \rightarrow NH_4^+ + OH^- \qquad \text{(Formula 3)}$$

Enhancement of the reaction of Formula 3 decreases the number of $H^+$ ions relative to the number of $OH^-$ ions, as shown in FIG. 7(b). Thereby, the negative charge on the fine bubbles becomes higher, and the positively charged $Ca^{2+}$ becomes easy to adsorb.

In the case of using nitrogen as in embodiment 2, the ion adsorption reaction of Formula 3 can be enhanced compared to the case of using air as in embodiment 1, and therefore the metal ion adsorption is further enhanced. Thereby, more metal ions can be separated and removed from hard water.

The aforementioned principle is not limited to nitrogen, and possibly any gas capable of reacting with $H^+$ ions to reduce the number of $H^+$ ions relative to the number of $OH^-$ ions is also applicable.

(4) Enhancement of Metal Ion Crystallization

Since nitrogen is an inert gas different from air, once nitrogen is supplied into hard water, the partial pressure balance of the gas contained in hard water is lost. Thus, the reaction as shown in FIG. 8 is enhanced.

Figure 8:
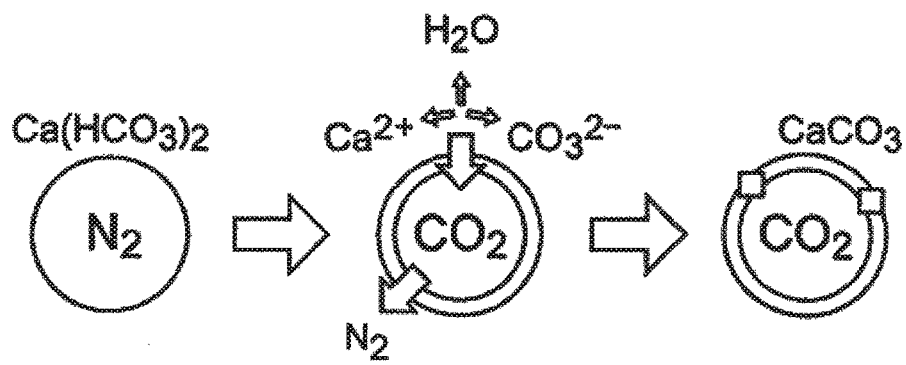
FIG. 8 presents a schematic drawing for explaining a hypothetical principle of metal ion crystallization with the ion removal device according to embodiment 2.

As shown in FIG. 8, other gas components dissolved in hard water acts to replace the fine bubbles composed of nitrogen. In the example shown in FIG. 8, $Ca(HCO_3)_2$ present around the fine bubbles contains $CO_2$, and this $CO_2$ is extracted and acts to replace nitrogen. That is, the following reaction is enhanced.

$$Ca(HCO_3)_2 \rightarrow CaCO_3 + CO_2 + H_2O \qquad \text{(Formula 4)}$$

As described above, a reaction for generating insoluble $CaCO_3$ from soluble $Ca(HCO_3)_2$ is caused. At this time, $CO_2$ and $H_2O$ are generated. Since $CaCO_3$ is insoluble, it precipitates as crystal.

The above reaction makes it possible to crystallize and precipitate the metal component contained as $Ca^{2+}$ of $Ca(HCO_3)_2$ in hard water. Thereby, the metal ions can be removed from hard water.

The aforementioned principle is not limited to nitrogen, and possibly any gas other than air that loses the partial pressure balance of the gas dissolved in hard water is also applicable.

As described above, in embodiment 2, the reactions explained in the sections "(3) Enhancement of Metal Ion Adsorption" and "(4) Enhancement of Metal Ion Crystallization" can be enhanced compared to the case using air by generating fine bubbles incorporating nitrogen and supplying the fine bubbles into hard water. Thereby, precision of the metal ion removal from hard water can be improved.

Embodiment 3

The metal ion removal method with the ion removal device according to embodiment 3 of the present invention will be explained. In embodiment 3, primarily points different from points in embodiments 1 and 2 will be explained, and descriptions overlapping the descriptions in embodiments 1 and 2 are omitted.

Embodiment 3 defers from embodiments 1 and 2 in that the fine bubble generation means 6 generates the fine bubbles originating from one gas selected from a plurality of gases in embodiments 1 and 2, whereas the fine bubbles are generated originating from a mixture gas prepared by mixing a plurality of gases in embodiment 3.

In embodiment 3, particularly, a mixture gas of two gases, a first gas which is a basic gas and a second gas which has a slower solution velocity than of the first gas is used as a mixture gas for generating fine bubbles. That is, instead of the fine bubble generation means 6 shown in FIG. 1, a fine bubble generation means (not shown) for generating fine bubbles with a mixture gas of the first gas and the second gas is used.

It is predicted that not only the actions of the aforementioned "(1) Metal Ion Adsorption" and "(2) Metal Ion Crystallization" but also the actions as described in the following sections (5) and (6) are enhanced by generating the fine bubbles with the mixture gas containing the first gas and the second gas. Note that the present invention is not necessarily restricted to the specific principle described in the following sections (5) and (6).

(5) Potential Change on Fine Bubble Surface with First Gas

The first gas contained in the mixture gas is a basic gas which receives $H^+$ in an acid-base reaction. The first gas dissolves in water to generate $OH^-$. Specifically, a reaction of the following Formula 5-1 is caused.

$$X + H_2O \rightarrow XH^+ + OH^- \qquad \text{(Formula 5-1)}$$

Figure 9:
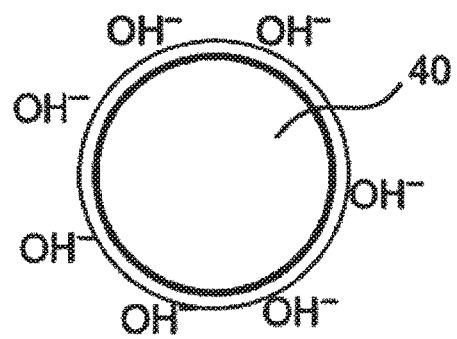
FIG. 9 presents a schematic drawing for explaining a hypothetical principle of metal ion adsorption with an ion removal device according to embodiment 3.

In Formula 5-1, the first gas is represented by the chemical formula X. As a result of the reaction of Formula 5-1, a ratio of $OH^-$ around a fine bubble 40 increases compared to a ratio of $H^+$ as shown in FIG. 9 (illustration of $H^+$ is omitted in FIG. 9). A potential of the solid-liquid interface strongly depends on pH of the water quality because $H^+/OH^-$ in water is a potential-determining ion. When $H^+$ increases, the positive charge becomes higher, and when $OH^-$ increases, the negative charge becomes higher. Thereby, the negative charge on the fine bubble 40 becomes higher, and the positively charged $Ca^{2+}$ becomes easy to adsorb. In this manner, the effect of adsorbing the metal ions to the fine bubble 40 can be improved.

Furthermore, in embodiment 3, particularly ammonia which is a basic gas is used as the first gas. When using ammonia, the above Formula 5 is embodied in the following Formula 6.

$$NH_3 + H_2O \rightarrow NH_4^+ + OH^- \qquad \text{(Formula 6)}$$

As a result of generating the fine bubble 40 using ammonia which has a high aqueous solubility and is a general-purpose gas, a cost for generating the fine bubble 40 can be reduced while improving the aforementioned metal ion adsorption effect.

Incidentally, the aforementioned principle is not limited to ammonia, and possibly any basic gas is also applicable. Examples of such a basic gas include methylamine, ethylamine, propylamine, isopropylamine, butylamine, hexylamine, cyclohexylamine, dimethylamine, diethylamine, diisopropylamine, dipropylamine, di-n-butylamine, ethanolamine, diethylethanolamine, dimethylethanolamine, ethylenediamine, dimethylaminopropylamine, N,N-dimethylethylamine, trimethylamine, triethylamine, tetramethylenediamine, diethylenetriamine, propyleneimine, pentamethylenediamine, hexamethylenediamine, morpholine, N-methylmorpholine, and N-ethylmorpholine.

In addition, as shown in Formula 5-1, X is not limited to the basic gas, and it is considered that any "hydroxyl ion-donating gas" which reacts with water ($H_2O$) to donate hydroxyl ion ($OH^-$) exhibits the same effect. An example of the hydroxyl ion-donating gas is a soluble ozone gas ($O_3$). It is considered that when the ozone gas is supplied to water, a reaction represented by the following Formula 5-2 similar to the above Formula 5-1 is caused.

(Formula 5-2)

It is considered that, according to the above Formula 5-2, the hydroxyl ion-donating gas "X" capable of causing the reaction represented by the following Formula 5-3 also exhibits the same effect.

(Formula 5-3)

An experiment example regarding ozone will be explained in example 6.

(6) Retention of Fine Bubble with Second Gas

As explained in the above section "(5) Potential Change on Fine Bubble Surface with First Gas", the first gas as the basic gas contained in the mixture gas dissolves in water to increase a ratio of $OH^-$ on the surface of the fine bubble 40. Such a first gas is mixed with the second gas having a slower solution velocity than of the first gas. As a result of mixing such a second gas, the whole fine bubble 40 is prevented from dissolving in water even when the first gas is dissolved in water, and the state of the fine bubble 40 can be retained. The effect of adsorbing $Ca^{2+}$ ions resulting from the fine bubbles explained in embodiments 1 and 2 can be retained by retaining the state of the fine bubble 40.

In embodiment 3, particularly nitrogen is used as the second gas. The fine bubble 40 is generated using a general purpose gas nitrogen which is harmless to human bodies, so that a cost for generating the fine bubble 40 can be reduced while securing the safety. In addition, since nitrogen is a non-water soluble gas (non-soluble gas), the effect of maintaining the state of the fine bubble 40 can be more effectively exhibited.

The aforementioned principle is not limited to nitrogen, and possibly any gas having a slower solution velocity compared to that of the first gas as the basic gas is also applicable. When the second gas is selected, a gas having a slower (lower) water solution velocity (solubility) than of the first gas under the same conditions including the temperature and the pressure may be selected. Examples of such a second gas include, in ascending order of solubility, nitrogen, hydrogen, carbon monoxide, butane, oxygen, methane, propane, ethane, nitrogen monoxide, ethylene, propene, acetylene, and carbon dioxide. Above all, when the non-water soluble gas such as nitrogen monoxide, oxygen, and hydrogen is used, the effect of maintaining the state of the fine bubble 40 can be more effectively exhibited.

Figure 7:
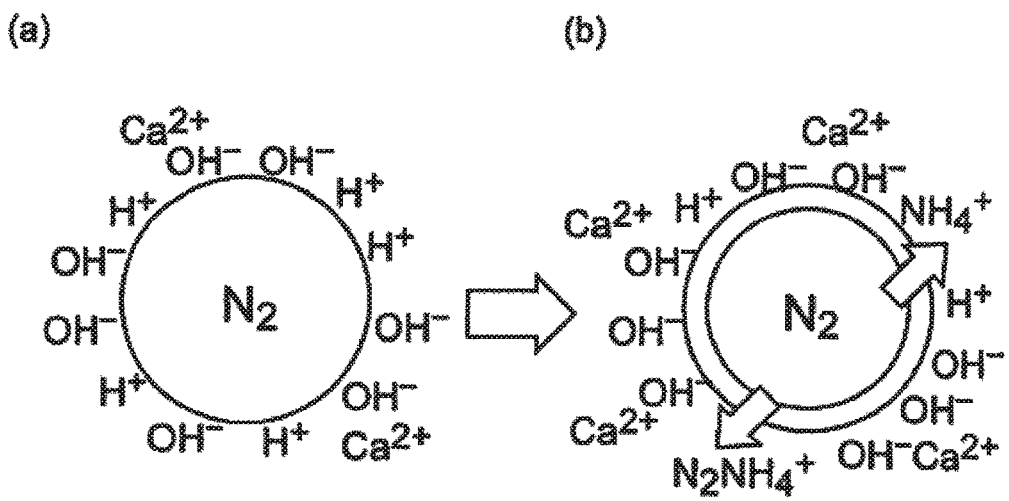
FIG. 7 presents a schematic drawing for explaining a hypothetical principle of metal ion adsorption with an ion removal device according to embodiment 2.

Incidentally, dissolution of nitrogen in hard water was explained was explained with reference to FIGS. 7 and 8 in the sections "(3) Enhancement of Metal Ion Adsorption" and "(4) Enhancement of Metal Ion Crystallization" in embodiment 2, and it is considered that these reactions are also caused at the same time. Nitrogen hardly dissolves in water because it is water-insoluble, and strongly exerts an action of retaining the state of the fine bubble 40, but there is not a little water-soluble nitrogen. Thus, not a few phenomena of nitrogen dissolved in water as explained in the sections "(3) Enhancement of Metal Ion Adsorption" and "(4) Enhancement of Metal Ion Crystallization" are considered to also simultaneously occur with the phenomena of nitrogen retaining the fine bubbles explained in the section "(6) Retention of Fine Bubble with Second Gas".

As described above, the fine bubble generation means according to embodiment 3 generates the fine bubble 40 with the mixture gas of the first gas configured to react with water to donate hydroxyl ions and the second gas having a slower solution velocity compared to the first gas. The first gas which is a hydroxyl ion-donating gas reacts with water to increase the ratio of $OH^-$ on the surface of the fine bubble 40. Thereby, the effect of adsorbing metal ions such as $Ca^{2+}$ to the fine bubble 40 can be increased. Furthermore, the second gas having a slower solution velocity compared to the first gas is mixed to prevent the fine bubble 40 from completely dissolving in water and retain the state of the fine bubble 40.

In embodiment 3, the first gas is a soluble basic gas (ammonia). In this manner, the first gas as the basic gas is first dissolved in water, and the second gas having a slower solution velocity compared to the basic gas is negatively charged, so that the aforementioned effect can be exhibited by utilizing the difference in the solution velocity between two gases.

Although the mixing ratio of ammonia and nitrogen on the fine bubble 40 may be set to any value, and for example, set so that a mixing ratio of nitrogen to ammonia is high (e.g. a ratio (volume ratio) of ammonia:nitrogen is 1:99). As a result of such a setting, an area where $OH^-$ increases by dissolution of ammonia resides only as far as the vicinity of the surface of the fine bubble 40, and the $OH^-$ ratio hardly changes at a position away from the fine bubble 40. In this manner, the water quality of the whole water can be prevented from changing while changing while changing only the vicinity of the surface of the fine bubble 40. On the other hand, the state of the fine bubble 40 can be maintained longer by increasing the ratio of nitrogen. In this manner, in the mixture gas, these effects can be exhibited by setting the quantity of the second gas having a slower solution velocity than of the basic gas so as to be larger than the quantity of the first gas as the basic gas. Note that, since the quantity is proportional to the volume under the same temperature and pressure conditions, either the quantity or the volume may be used to set the mixing ratio of the first gas and the second gas.

Alternatively, the mixing ratio may be set so that the ratio of ammonia to nitrogen is high. As a result of such a setting, the metal components contained in hard water can be further crystallized and removed. Such a principle of crystallization enhancement will be explained in example 2-4 described later.

Unlike the supplying configuration that ammonia and nitrogen are separately formed into fine bubbles and separately supplied to hard water without mixing them, the fine bubble generation means according to embodiment 3 is intended to supply the fine bubble 40 with the mixture gas of ammonia and nitrogen to hard water. According to such a supply method, ammonia is prevented from dissolving alone at a position away from the fine bubble 40, and therefore a function of increasing $OH^-$ only in the vicinity of the surface of the fine bubble 40 can be sufficiently exhibited.

Next, the metal ion adsorbing effect of the fine bubble 40 with the mixture gas of ammonia as the first gas and nitrogen as the second gas, particularly the hypothetical principle to finally crystallize the metal ions will be explained with reference to the schematic drawing of FIG. 10.

Figure 10:
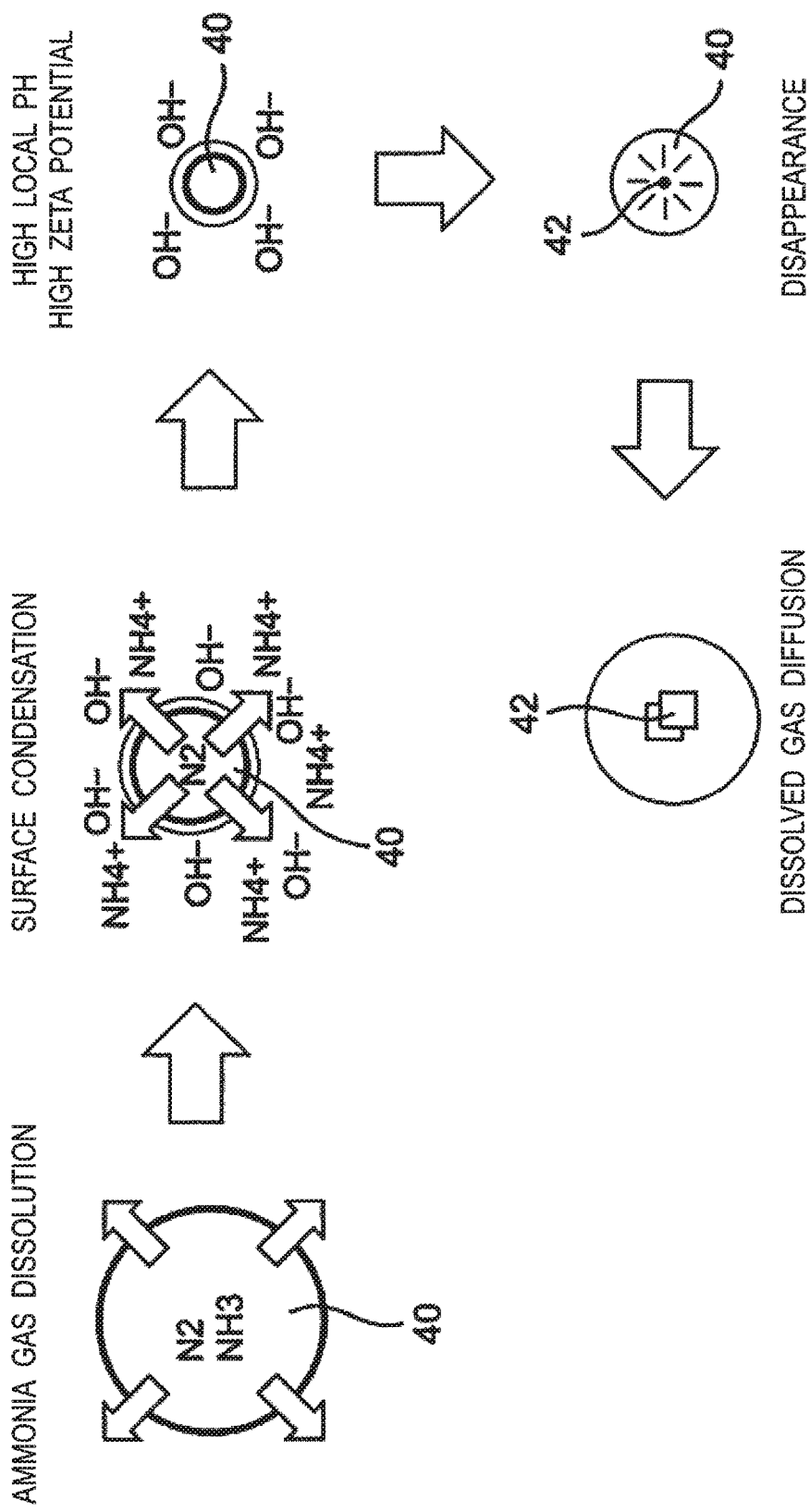
FIG. 10 presents a schematic drawing for explaining a hypothetical principle of metal ion adsorption and crystallization with the ion removal device according to embodiment 3.

As shown in FIG. 10, once the fine bubble 40 is supplied into hard water, the water-soluble ammonia out of ammonia and nitrogen constituting the fine bubble 40 dissolves in the surrounding water (ammonia gas dissolution). Thereby, as explained in the section "(5) Potential Change on Fine Bubble Surface with First Gas", $NH_4^+$ is generated on the surface of the fine bubble 40 and the ratio of $OH^-$ increases (surface condensation). At this time, the $Ca^{2+}$ ion adsorption effect increases.

As the surface condensation further progresses, the concentration of $OH^-$ on the surface of the fine bubble 40 becomes maximum. That is, a pH on the surface of the fine bubble 40 becomes maximum, and a zeta potential of the fine bubble 40 becomes maximum (the local pH is high, and the zeta potential is high).

In the aforementioned states "ammonia gas dissolution", "surface condensation", and "high local pH and high zeta potential", $Ca^{2+}$ is adsorbed to the fine bubble 40. At this time, the fine bubble 40 adsorbing $Ca^{2+}$ can be separated from hard water to remove the metal ions from hard water.

When the separation has not been carried out, or when the separation has been carried out but some bubbles remain as the fine bubble 40, the $Ca^{2+}$ adsorbed to the surface of the fine bubble 40 starts to crystallize. Specifically, $Ca^{2+}$ crystallizes and precipitates as a crystal 42. Furthermore, the fine bubble 40 starts to disappear (disappearance) along with precipitation of the crystal 42.

As the crystallization of $Ca^{2+}$ and the disappearance of the fine bubble 40 progress, the non-water soluble nitrogen maintaining the state of the fine bubble 40 diffuses as a dissolved gas into water (dissolved gas diffusion).

In the aforementioned states "disappearance" and "dissolved gas diffusion", ions contained as metal ions in hard water precipitate as the crystal 42. The crystal 42 precipitated in such a way can be separated from hard water to crystallize and remove the metal ions in hard water.

Example 2-4

Next, example 2-4 in embodiment 3 will be explained.

In example 2-4, the inventors of the present invention carried out an experiment regarding influence of the aforementioned mixing ratio of ammonia and nitrogen in the fine bubble 40 on the metal ion crystallization. Specifically, the experiment was carried out using a device 50 shown in FIG. 11.

Figure 11:
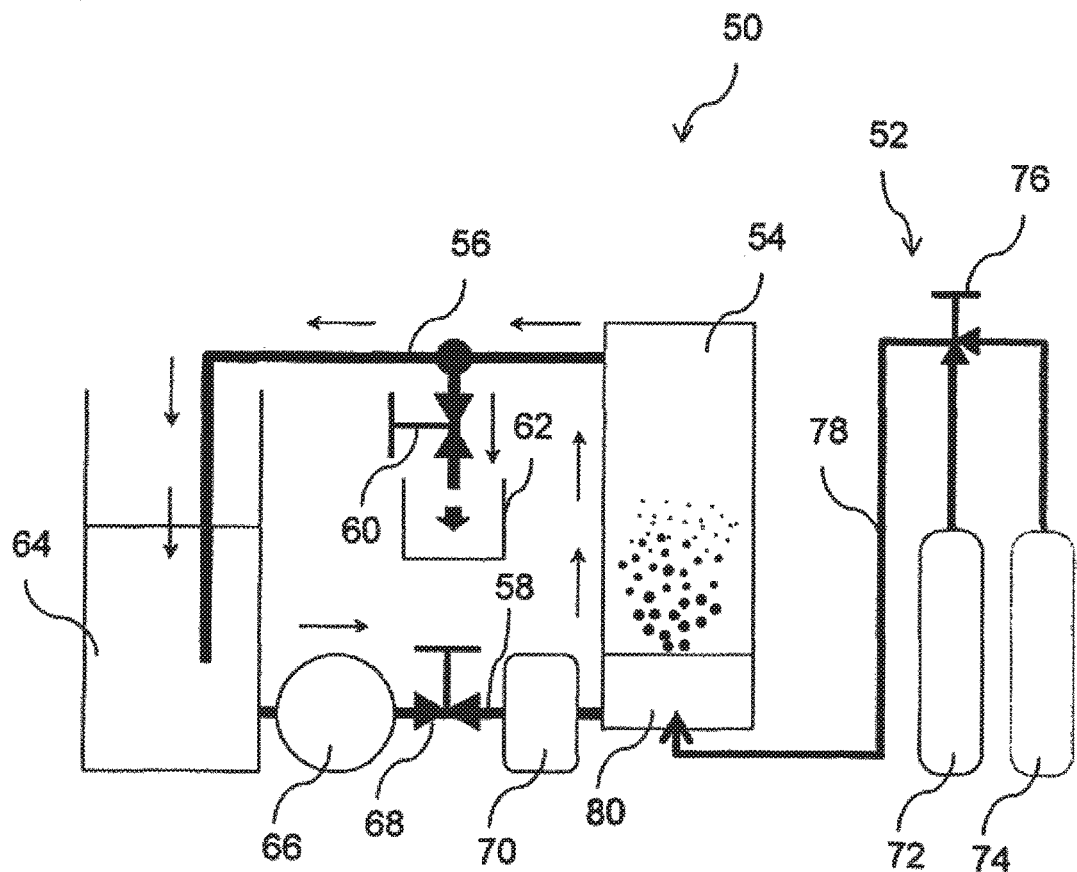
FIG. 11 presents a schematic configuration of a device used in example 2-4 in embodiment 3.

FIG. 11 presents a schematic configuration of the device 50 used in example 2-4. The device 50 shown in FIG. 11 includes a mixture gas supply section 52, a treatment tank 54, a first pipe 56, a second pipe 58, a water collection valve 60, a water collector 62, and a water storage tank 64, a pump 66, a flow regulation valve 68, and a flowmeter 70.

The mixture gas supply section 52 refers to a member for supplying a mixture gas to the treatment tank 54. The mixture gas supply section 52 includes an ammonia supply source 72, a nitrogen supply source 74, a mixing ratio regulation valve 76, a supply pipe 78, and a fine bubble supply section 80.

The mixture gas supply section 52 generates a mixture gas, which is prepared by mixing ammonia (first gas) and nitrogen (second gas) using the ammonia supply source 72 and the nitrogen supply source 74. The mixing ratio of ammonia and nitrogen can be set to any ratio by the mixing ratio regulation valve 76. The mixture gas is supplied to the fine bubble supply section 80 disposed on the bottom portion of the treatment tank 54 through the supply pipe 78. The fine bubble supply section 80 refers to a member for forming the mixture gas into fine bubbles.

The treatment tank 54 refers to a tank for storing hard water as water to be treated (hard water storage section). Based on the principle explained in embodiment 3, the metal components are removed, particularly crystallized from hard water by supplying fine bubbles with the mixture gas into hard water in the treatment tank 54. The treated water is sent to the first pipe 56. The water collection valve 60 is disposed on the way of the first pipe 56. The treated water passing through the first pipe 56 is collected by opening and closing the water collection valve 60. The collected treated water is put into the water collector 62.

The first pipe 56 is connected to the water storage tank 64. The water storage tank 64 refers to a tank for storing the treated water. The treated water stored in the water storage tank 64 is returned to the reaction tank 54 through the second pipe 58. Thereby, the treated water circulates.

The second pipe 58 is equipped with the pump 66, the flow regulation valve 68, and the flowmeter 70. The pump 66 refers to a member for generating a propulsive force for making the treated water in the water storage tank 64 flow through the second pipe 58. The flow regulation valve 68 refers to a valve for regulating the flow rate of the treated water passing through the second pipe 58. The flowmeter 70 refers to an apparatus for measuring the flow rate of the treated water flowing through the second pipe 58.

Various parameters were measured in such a way that the metal components in hard water were removed in the treatment tank 54 while continuously operating the pump 66 using this device 50, and the treated water was collected from the water collector 62. In example 2-4, particularly a ratio of the crystallized metal components contained in the treated water (crystallization ratio) was investigated. Note that the "crystallization ratio" in the present specification means not only a ratio of a crystal configured so that atoms and molecules are periodically arranged with regularity but also a ratio of a mere substance precipitated as a solid. The crystallization ratio may be referred to as "precipitation ratio".

Figure 12:
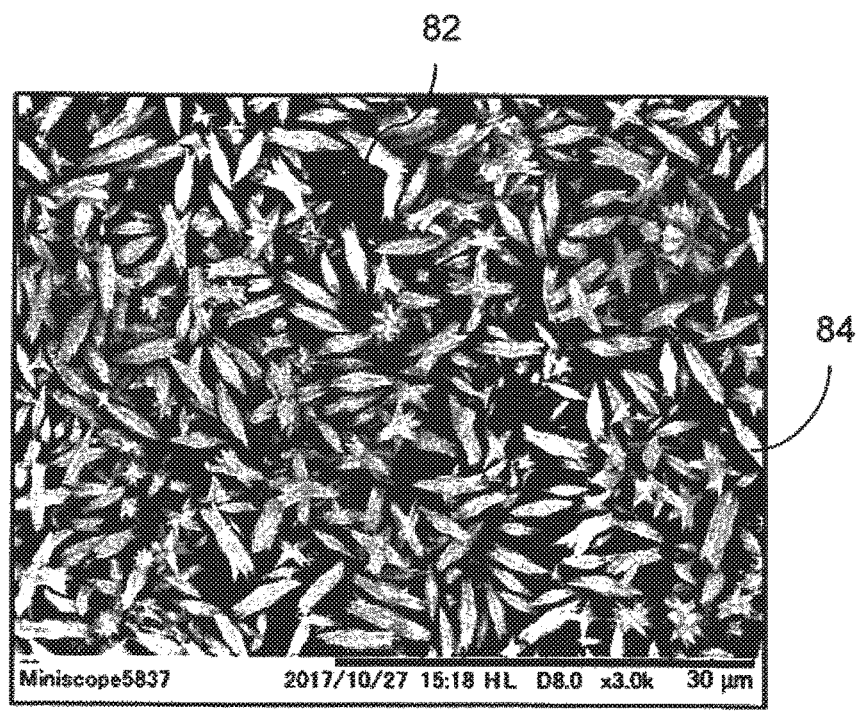
FIG. 12 presents a state of metal components crystallized in hard water.

FIG. 12 presents an example of a result of observing water actually treated in example 2-4 by a scanning electron microscope (SEM). As shown in FIG. 12, a lot of crystals 84 precipitate in a treated water 82.

In examples 2 and 3, a hard water 1 was used as water to be treated. The hard water 1 is Evian (registered trademark) having a hardness of about 300 mg/L. In example 4, two types of waters, the hard water 1 and a hard water 2 were used. The hard water 2 is Contrex (registered trademark) having a hardness of about 1400 mg/L.

Example 2

In example 2, the treated water after a predetermined time had elapsed was collected as a sample water by the water collector 62 while flowing hard water into the reaction tank 54 by operating the pump 66 using the device 50. In example 2, the mixing ratio of ammonia and nitrogen in the mixture gas was varied to investigate difference in the crystallization ratio at each mixing ratio. Specific experimental conditions of example 2 will be described below. In example 2, all the treated water supplied from the reaction tank 54 to the first pipe 56 was discarded except water collected by the water collector 62, and was not supplied to water storage tank 64.

(Experimental Condition)

Type of water to be treated: Hard water 1

Mixing ratio of ammonia in mixture gas: 0% (nitrogen only) 30%, 40%, 50%, 60%, 70%, 80%, 90%, 100% (ammonia only)

Flow rate of water to be treated: 2.6 L/min

Flow rate of mixture gas: 0.03 L/min

Time from pump operation to collection: 3 minutes

Measurement items of sample water: pH, Ca hardness (mg/L), total carbonate concentration (mg/L)

The measurement items of the sample water were measured using water from which crystals of the metal components precipitated in the sample water were removed by filtering the collected sample water. The Ca hardness refers to a value obtained by converting the $Ca^{2+}$ content in the treated water per unit volume into calcium carbonate (CaCO3). For measuring pH, Ca hardness, and total carbonate concentration, each commercially available measuring apparatus was used.

Figure 13A:
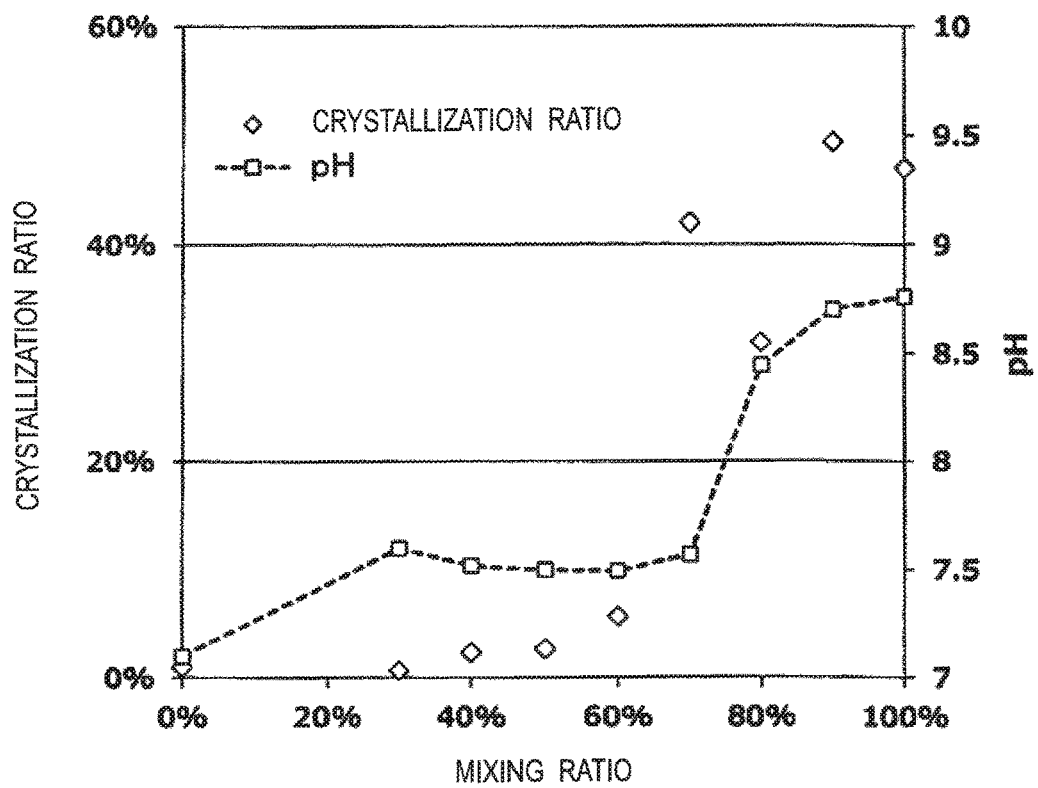
FIG. 13A presents a diagram showing results of example 2 in embodiment 3.
Figure 13B:
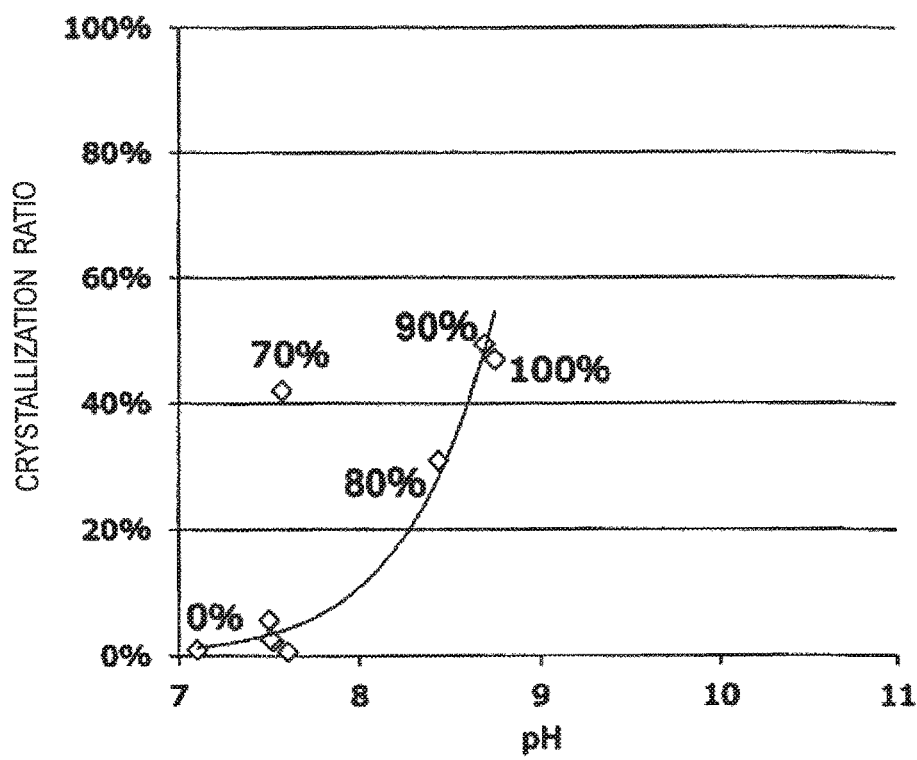
FIG. 13B presents a diagram showing results of example 2 in embodiment 3.

FIG. 13A and FIG. 13B present experimental results in example 2.

In FIG. 13A, the abscissa represents the mixing ratio (%) of ammonia in the mixture gas, and the ordinate represents the crystallization ratio (%) of the sample water. In FIG. 13B, the abscissa represents the pH of the sample water, and the ordinate represents the crystallization ratio (%) of the sample water.

The "crystallization ratio" was calculated by an equation (Ca hardness of water to be treated before operation−Ca hardness of sample water after operation)/Ca hardness of water to be treated before operation. The crystallization ratio calculated in such a way expresses how much metal components have crystallized per unit volume of the treated water. The higher crystallization ratio expresses that more metal components are crystallized from the treated water.

FIGS. 13A and 13B show that the higher the mixing ratio of ammonia is, the higher the crystallization ratio is. In particular, when the mixing ratio of ammonia is 70% or higher, the crystallization ratio dramatically increases.

FIGS. 13A and 13B show that the higher the mixing ratio of ammonia is, the higher the pH is. However, although the pH increases, the value shifts between at most 8.5 and 9. The pH reference value of tap water defined by the Ministry of Health, Labor and Welfare ranges 5.8 to 8.6, and it can be seen that even when the mixing ratio of ammonia is high, the pH value shifts in a range close to the range of the tap water. A desirable pH range of alkaline ionized water for drinking defined in Act on Securing Quality, Efficacy and Safety of Products Including Pharmaceuticals and Medical Devices is pH 9 to 10. Since the pH value can be suppressed lower than this range, the sample water is proved to be suitable also as drinking water.

It is considered that the reason why increase in pH does not excessively rise even when the mixing ratio of ammonia is high is because not the pH of the whole treated water but rather the pH at the local area around the fine bubble 40 is primarily raised, as explained with reference to FIG. 10.

Example 3

In example 3, like example 2, the treated water after a predetermined time had elapsed was collected as a sample water by the water collector 62 while flowing hard water into the reaction tank 54 by operating the pump 66 using the device 50. In example 3, only two patterns of ammonia mixing ratios 70% and 100% in the mixture gas were used. In addition, unlike example 2, the sample water was collected at predetermined intervals from the operation of the pump 66 to measure various parameters. Furthermore, unlike example 2, all the treated water supplied from the reaction tank 54 to the first pipe 56 was returned to the water storage tank 64 except water collected by the water collector 62, and was circulated. Specific experimental conditions of example 3 will be described below.

(Experimental Condition)

Type of water to be treated: Hard water 1

Mixing ratio of ammonia in mixture gas: 70%, 100% (only ammonia)

Flow rate of water to be treated: 2.6 L/min

Flow rate of mixture gas: 0.03 L/min

Measurement items of sample water: pH, Ca hardness (mg/L), total carbonate concentration (mg/L)

Figure 14A:
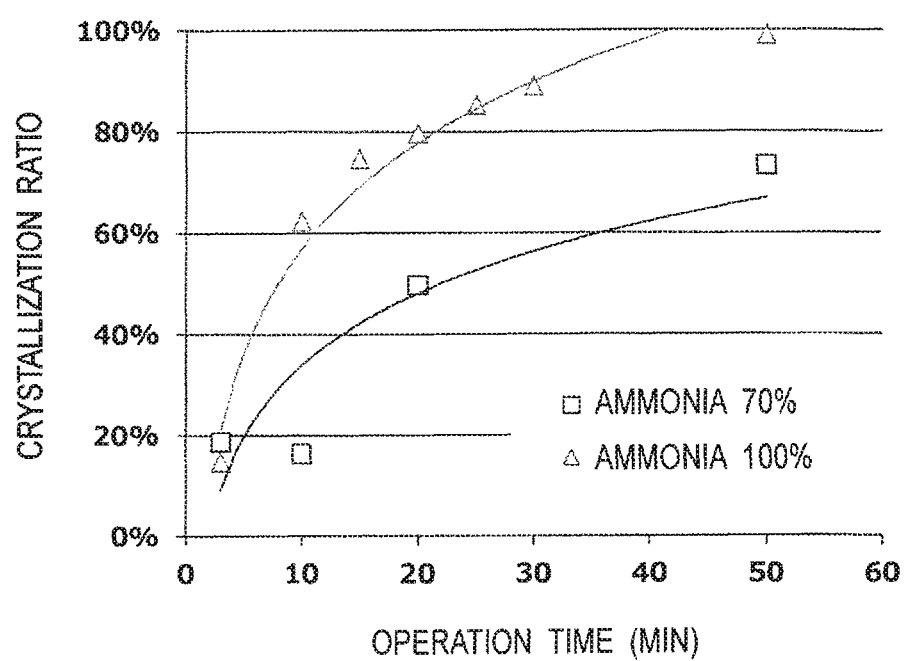
FIG. 14A presents a diagram showing results of example 3 in embodiment 3.
Figure 14B:
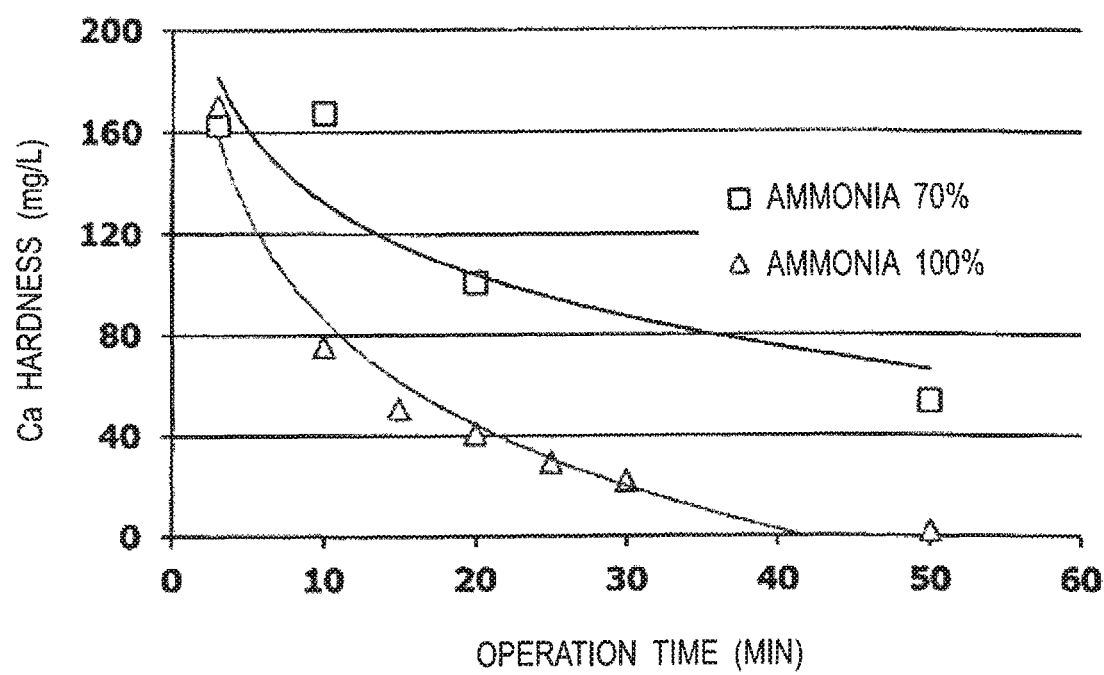
FIG. 14B presents a diagram showing results of example 3 in embodiment 3.
Figure 14C:
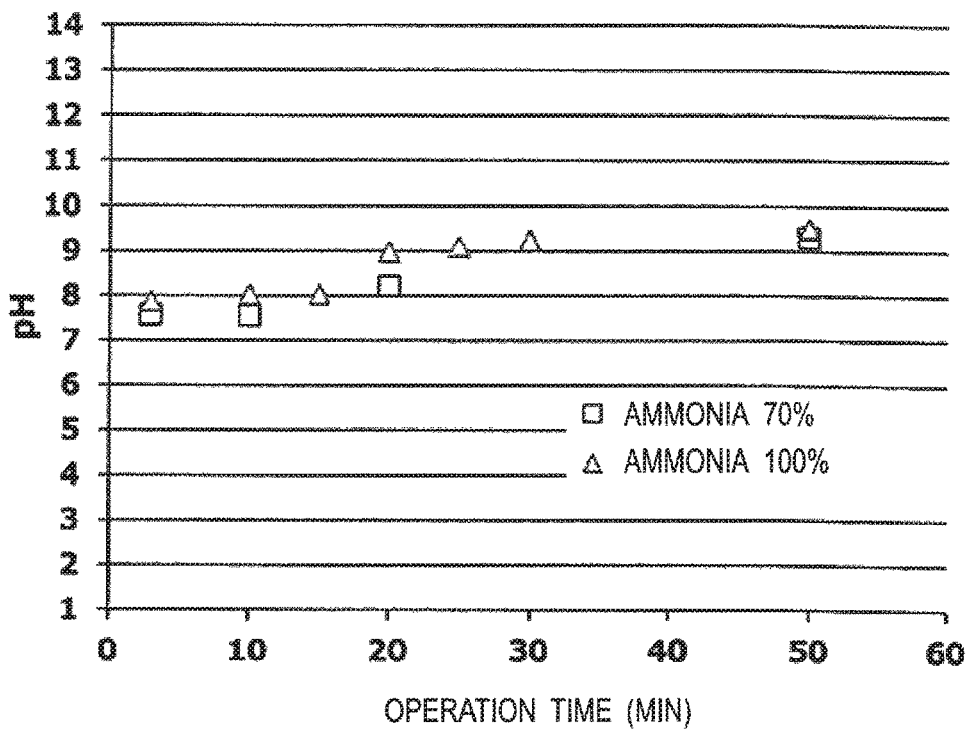
FIG. 14C presents a diagram showing results of example 3 in embodiment 3.

FIG. 14A, FIG. 14B, and FIG. 14C present experimental results in example 3.

In FIG. 14A, the abscissa represents the operation time (minute) of the pump 66, and the ordinate represents the crystallization ratio (%) of the sample water. In FIG. 14B, the abscissa represents the operation time (minute) of the pump 66, and the ordinate represents the Ca hardness (mg/L) of the sample water. In FIG. 14C, the abscissa represents the operation time (minute) of the pump 66, and the ordinate represents the pH of the sample water.

As shown in FIG. 14A, in both cases of the ammonia mixing ratios of 70% and 100%, the crystallization ratio increases as the operation time passes. In addition, the Ca hardness decreases as the operation time passes, as shown in FIG. 14B. This reveals that $Ca^{2+}$ of the metal components dissolved in hard water is crystallized as $CaCO_3$ by introducing the fine bubbles with the mixture gas.

On the other hand, in the case of the ammonia mixing ratio of 100% rather than the case of 70%, the increasing rate of the crystallization ratio and the decreasing rate of the Ca hardness are enhanced. This reveals that ammonia significantly contributes to the crystallization of $Ca^{2+}$ into $CaCO^3$.

As shown in FIG. 14C, in both cases of the ammonia mixing ratios of 70% and 100%, the pH loosely increases as the operation time passes. There is not so significant difference in the pH between the cases of the ammonia mixing ratios of 70% and 100%. Also, even after 50 minutes has passed from the start of the operation, the pH is between 9 and 10 and does not excessively increases. It is considered that the reason why the increasing rate of the pH does not so excessively increase as described above is because not the pH of the whole treated water but rather the pH at the local area around the fine bubble 40 is primarily raised, as explained with reference to FIG. 10.

Example 4

In example 4, like examples 2 and 3, the treated water after a predetermined time had elapsed was collected as a sample water by the water collector 62 while flowing hard water into the reaction tank 54 by operating the pump 66 using the device 50. In the same manner as in example 3, the sample water was collected at predetermined intervals from the operation of the pump 66 to measure various parameters. In the same manner as in example 3, all the treated water supplied from the reaction tank 54 to the first pipe 56 was returned to the water storage tank 64 except water collected by the water collector 62, and was circulated. On the other hand, in example 4, only one pattern of ammonia mixing ratio 70% in the mixture gas was used. In addition, unlike examples 2 and 3, two types of hard water, hard water 1 (hardness: about 300 mg/L) and hard water 2 (hardness: about 1400 mg/L) were used as the treated water. Specific experimental conditions of example 4 will be described below.

$HCO_3^-$ and $CO_3^{2-}$ function as components for crystallizing as $Ca^{2+}$ as $CaCO_3$, as explained for the principles of embodiments 1 to 3. Since the hard water 1 contains large amounts of $HCO_3$ and $CO_3^{2-}$, the hard water 1 is considered to have a higher increasing rate of the crystallization ratio than of the hard water 2.

The metal component content and the total carbonate concentrations in the hard waters 1 and 2 are shown in the following Table 1.

TABLE 1

|  | Content (mg/L) | | | $CO_3^{2-}$ content required for dissolution (mg/L) | | | Surplus amount (mg/L) |
| --- | --- | --- | --- | --- | --- | --- | --- |
|  | Ca | Mg | $CO_3^{2-}$ | Ca | Mg | Total |  |
| Molecular weight | 40 | 24.3 | 60 |  |  | 60 |  |
| Centrex | 468 | 74.8 | 372 | 702 | 184.691358 | 886.691358 | −514.691 |
| Evian | 80 | 26 | 357 | 120 | 64.19753086 | 184.1975309 | 172.8025 |

(Experimental Condition)
Type of water to be treated: Hard water 1 and hard water 2
Mixing ratio of ammonia in mixture gas: 70%
Flow rate of water to be treated: 2.6 L/min
Flow rate of mixture gas: 0.03 L/min
Measurement items of sample water: pH, Ca hardness (mg/L), total carbonate concentration (mg/L)

FIG. 15A, FIG. 15B, FIG. 15C, and FIG. 15D present experimental results in example 4.

Figure 15A:
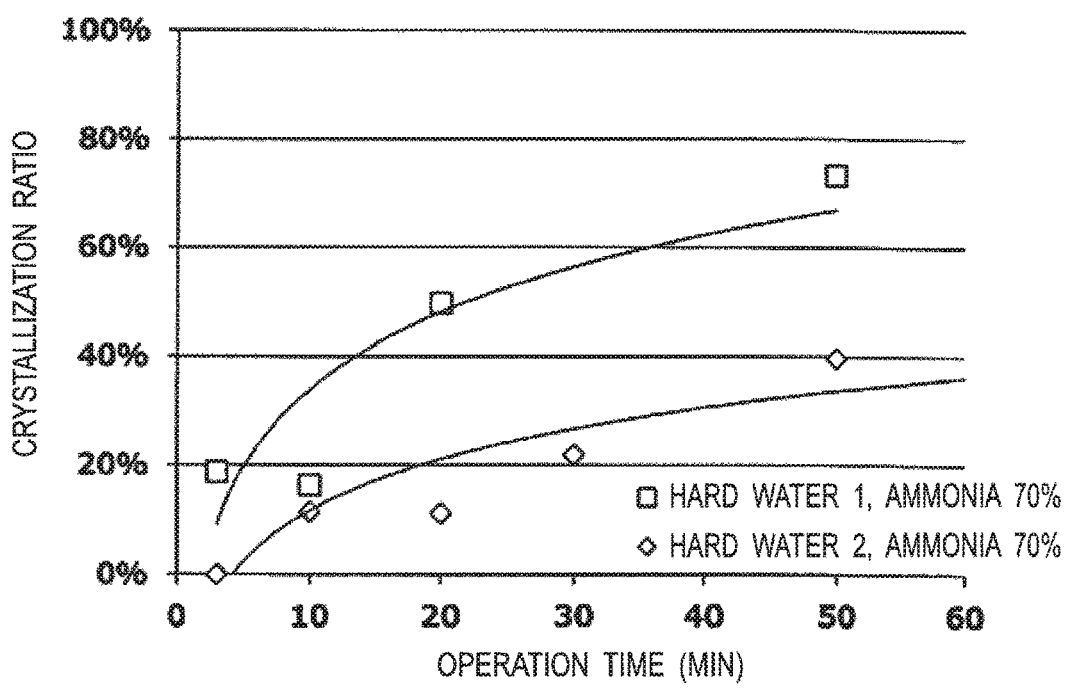
FIG. 15A presents a diagram showing results of example 4 in embodiment 3.
Figure 15B:
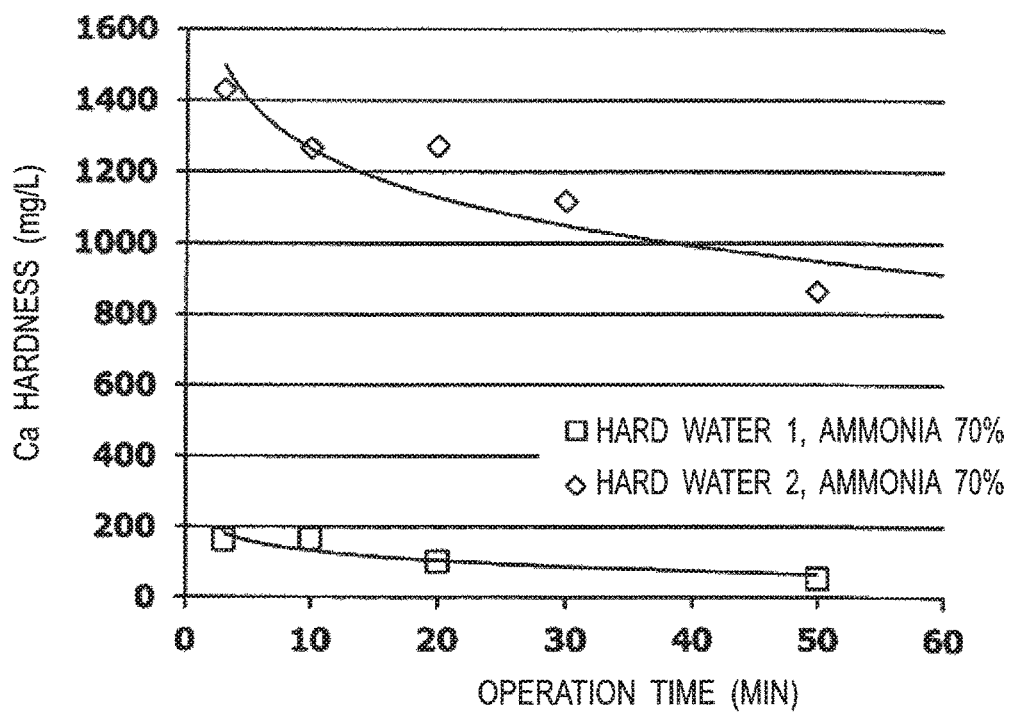
FIG. 15B presents a diagram showing results of example 4 in embodiment 3.
Figure 15C:
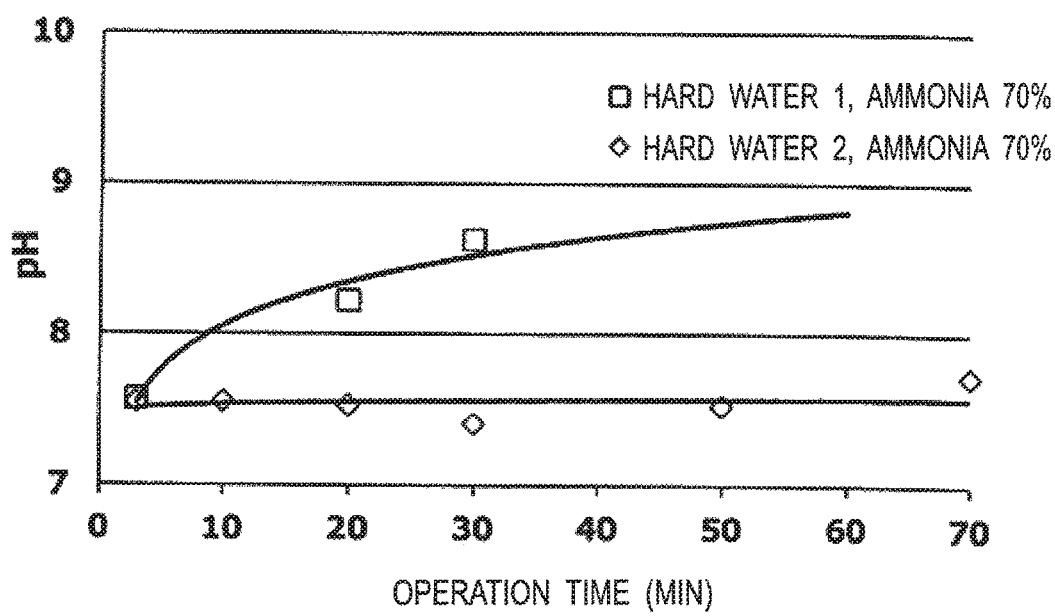
FIG. 15C presents a diagram showing results of example 4 in embodiment 3.
Figure 15D:
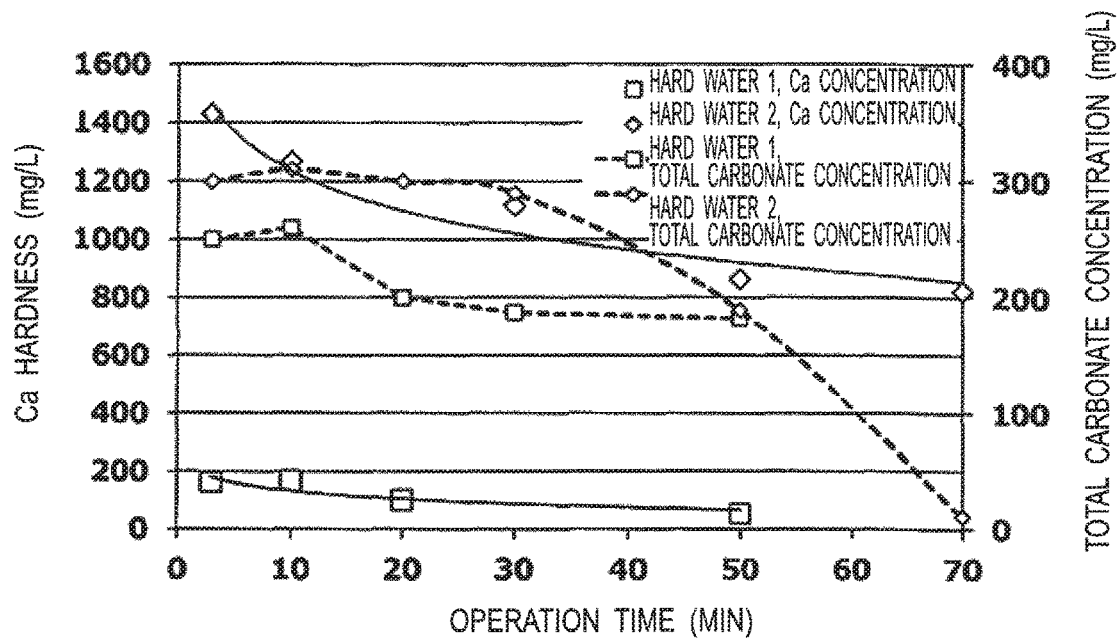
FIG. 15D presents a diagram showing results of example 4 in embodiment 3.

In FIG. 15A, the abscissa represents the operation time (minute) of the pump 66, and the ordinate represents the crystallization ratio (%) of the sample water. In FIG. 15B, the abscissa represents the operation time (minute) of the pump 66, and the ordinate represents the Ca hardness (mg/L) of the sample water. In FIG. 15C, the abscissa represents the operation time (minute) of the pump 66, and the ordinate represents the pH of the sample water. FIG. 15D presents a graph of which the ordinate is added with the total carbonate concentration (mg/L) in the graph of FIG. 15B.

As shown in FIGS. 15A and 15B, in both the hard water 1 and the hard water 2, the crystallization ratio increases and the Ca hardness decreases as the operation time passes. This reveals that $Ca^{2+}$ of the metal components dissolved in hard water is crystallized as $CaCO_3$ by introducing the fine bubbles with the mixture gas.

In addition, FIGS. 15A and 15C show that there are significant differences in the increasing rates of the crystallization ratio and the pH between the hard water 1 and the hard water 2. Specifically, it can be seen that the hard water 1 has higher increasing rates of the crystallization ratio and the pH than those of the hard water 2. In this regard, the inventors of the present invention focused on the "total carbonate concentration" and examined the "total carbonate concentration" based on the data shown in FIG. 15D.

As shown in FIG. 15D, a value of the total carbonate concentration in the hard water 1 is 150 to 200 mg/L when the operation time is 50 minutes. That is, the hard water 1 contains large amounts of $HCO_3$ and $CO_3^{2-}$. When the operation time is 50 minutes, the crystallization ratio of the hard water 1 reaches 70 to 80% as shown in FIG. 15A. On the other hand, a value of the total carbonate concentration in the hard water 2 is about 20 mg/L when the operation time is 70 minutes. Comparison with hard water 1 shows that the hard water 2 has considerably small amounts of $HCO_3^-$ and $CO_3^{2-}$. Incidentally, when the operation time is 70 minutes, the crystallization ratio of the hard water 2 is expected to be about 40% according to the data in FIG. 15A.

As shown in Table 1, in Evian (registered trademark) as the hard water 1, the contents of Ca, Mg and $CO_3^{2-}$ per unit volume of Evian are 80, 26, and 357 mg/L respectively. In Contrex (registered trademark) as the hard water 2, the contents of Ca, Mg and $CO_3^{2-}$ per unit volume of Contrex are 468, 74.8, and 372 mg/L respectively. As described above, in the hard water 1 and hard water 2, the $CO_3^{2-}$ contents per unit volumes are 357 mg/L and 372 mg/L respectively, which are approximately equal to each other. On the other hand, the $CO_3^{2-}$ content required for dissolving Ca and Mg relative to the Ca and Mg content in hard water is about 184 mg/L in the hard water 1, and about 887 mg/L in the hard water 2. That is, in the hard water 1, the amount of the actually contained $CO_3^{2-}$ is in excessive by about 173 mg/L relative to the $CO_3^{2-}$ content required for dissolving Ca and Mg. This means that when introducing the mixture gas with the fine bubbles, there is a plenty of $CO_3^{2-}$ for crystallizing $Ca^{2+}$. On the other hand, in the hard water 2, the amount of the actually contained $CO_3^{2-}$ is in shortage by about 515 mg/L relative to the $CO_3^{2-}$ content required for dissolving Ca and Mg. This means that when introducing the mixture gas with the fine bubbles, there is a small amount of $CO_3^{2-}$ for crystallizing $Ca^{2+}$, and the crystallization is not enhanced.

From the above results, it is considered that when the hard water to be treated contains a plenty of carbonates such as $HCO_3^-$ and $CO_3^{2-}$, the increasing rate of the crystallization can be improved. For the purpose of increasing the total carbonate content in hard water based on this result, carbon dioxide gas may be introduced into hard water before the fine bubbles are introduced. Specifically, a carbon dioxide gas generation means for generating carbon dioxide gas may be further installed. In addition, carbon dioxide gas may be generated by the carbon dioxide gas generation means and supplied to hard water before supplying the fine bubbles generated by the fine bubble generation means to hard water. It is considered that this process can enhance crystallization of the metal ions in hard water.

As described above, according to example 2-4 in embodiment 3, crystallization of the metal ions can be enhanced by setting the quantity of ammonia so as to be larger than the quantity of nitrogen in the mixture gas. Furthermore, crystallization of the metal ions can be greatly enhanced by setting the mixing ratio of ammonia in the mixture gas to 70% or higher.

Example 5

Example 5 includes a sensory evaluation experiment for evaluating "foaming" for the sample water (soft water) treated using the aforementioned device 50. The foaming is related to the foaming power depending on heights and sizes of the foam generated from the water surface. It is generally supposed that the smaller the amount of the hardness components is, the larger the foaming is, e.g. providing such an advantage that a washing effect is enhanced when the water is used for the purpose of washing.

In example 5, unlike example 2-4, fine bubbles were generated originating from a single gas ammonia instead of the mixture gas. That is, in the device 50 shown in FIG. 11, fine bubbles were generated using only an ammonia supply source 72 without using the nitrogen supply source 74. Since the method of using the device 50 is the same as in example 2-4, explanation of the method is omitted.

The experimental method of example 5 is based on the standard of "foaming": SHASE-S 218 of Society of Heating, Air-conditioning and Sanitary Engineers of Japan. Specifically, diluted water was prepared by diluting 1.5 g of pure soap with 200 ml of water, then 1 mL of the diluted water and 9 mL of water to be treated were mixed, and 10 mL of the mixture as an evaluation water was put into a measuring cylinder. As the pure soap, Cow brand red box al toilet soap (Cow Brand Soap Kyoshinsha Co., Ltd.) was used, and as 200 ml of water, distilled water Autostil WG221 (Yamato Scientific co., ltd.) was used. The measuring cylinder was shaken 50 times, and after 1 minute, a height of the foam from the water surface was measured.

In example 5, the same experiment was performed using, in addition to the sample water treated by the device 50, three types of water, hard water, tap water, and pure water. Hardnesses of these waters and the sample water are as follows.

Figure 16:
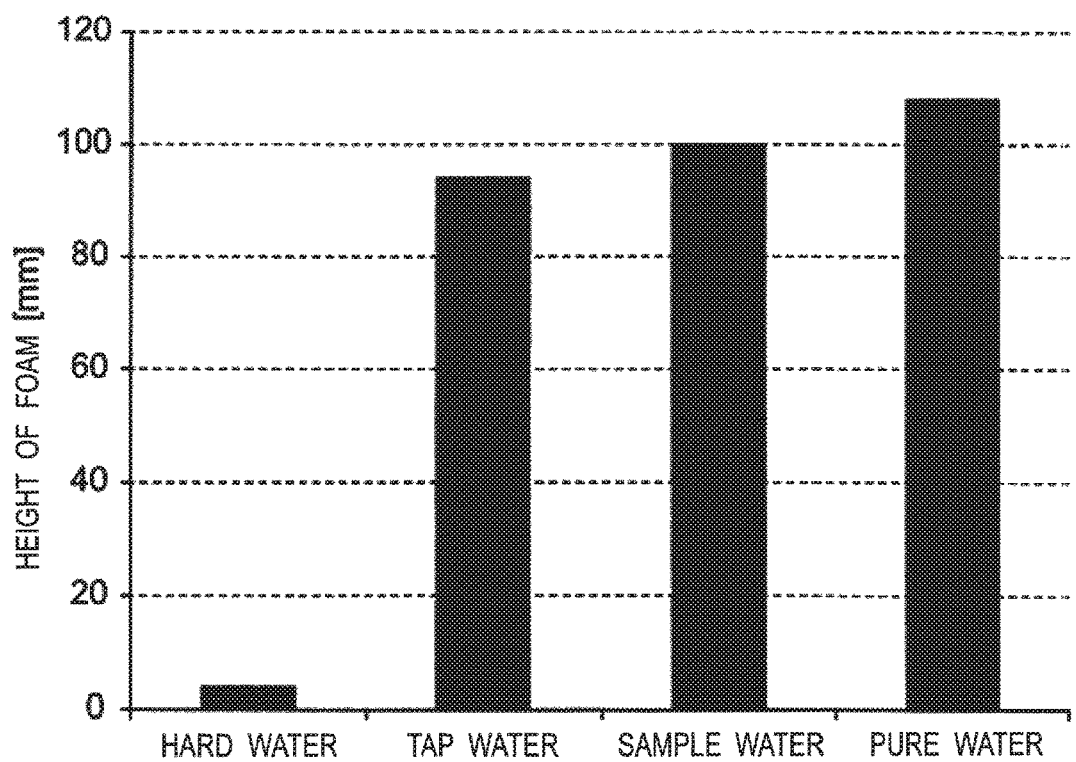
FIG. 16 presents a diagram showing results of example 5.

Hardness of hard water: Overall hardness is 300 mg/L, Ca hardness is 200 mg/L, Mg hardness is 100 mg/L
Hardness of tap water: Overall hardness is 72 mg/L, Ca hardness is 49 mg/L, Mg hardness is 23 mg/L
Hardness of pure water: Overall hardness is 0 mg/L, Ca hardness is 0 mg/L, Mg hardness is 0 mg/L
Hardness of sample water: Overall hardness is 118 mg/L, Ca hardness is 21 mg/L, Mg hardness is 97 mg/L FIG. 16 presents experimental results in example 5. In FIG. 16, the abscissa represents the type of water, and the ordinate represents the height (mm) of the foam extending from the surface of the evaluation water. The ordinate represents foaming and foaming power.

As shown in FIG. 16, the "hard water" which was highest in both the Ca and Mg hardnesses showed almost no foaming and the hardnesses were close to 0, whereas the "tap water", "sample water" and "pure water" showed almost the same high foaming levels. That is, in the "sample water" treated using the device 50, the foaming is improved relative to the hard water before treatment and achieves foaming close to those of "tap water" and "pure water". This revealed that foaming could be improved by removing the metal ions from hard water using the method in embodiments, and foaming at the same level as of tap water and pure water as soft water could be achieved.

When comparing the results shown in FIG. 16 with the concrete values of the hardness, the lower the Ca hardness is, the higher the foaming level is. This reveals that the Mg hardness value rather than the Ca hardness value is a dominant parameter that directly affects foaming.

Example 6

In embodiment 6, the water to be treated (hard water) is treated using the same device 50 (FIG. 11) as in example 2-4, and the treated sample waters are compared for the crystallization ratio.

In example 6, in particular, the difference in the crystallization ratio was examined by comparing the crystallization ratios between the case using micro-bubbles as fine bubbles and the case of using milli-bubbles as non-fine bubbles. That is, in the device 50 shown in FIG. 11, an experiment was carried out in two patterns, a pattern using the fine bubble generation section 80 as it is to generate micro-bubbles, and a pattern using another bubble generation section (not shown) instead of the fine bubble generation section 80 to generate milli-bubbles.

In example 6, unlike example 2-4, furthermore bubbles were generated originating from a single gas ozone instead of the mixture gas. That is, in the device 50 shown in FIG. 11, an ozone supply source (not shown) was used instead of the ammonia supply source 72 and the nitrogen supply source 74. As explained in embodiment 3, the ozone gas is a hydroxyl ion-donating gas.

The experimental conditions of example 6 are as follows.
Type of water to be treated (common): Hard water 1
Flow rate of water to be treated (common): 12 L/min
Volume of water stored in the reaction tank 54 9 L (common):
Flow rate of ozone gas (common): 0.12 L/min
Average diameter of micro-bubbles: 56 μm
Average diameter of milli-bubbles: 1021 μm
Measurement items of sample water (common): Ca hardness (mg/L), overall hardness (mg/L)

Figure 17A:
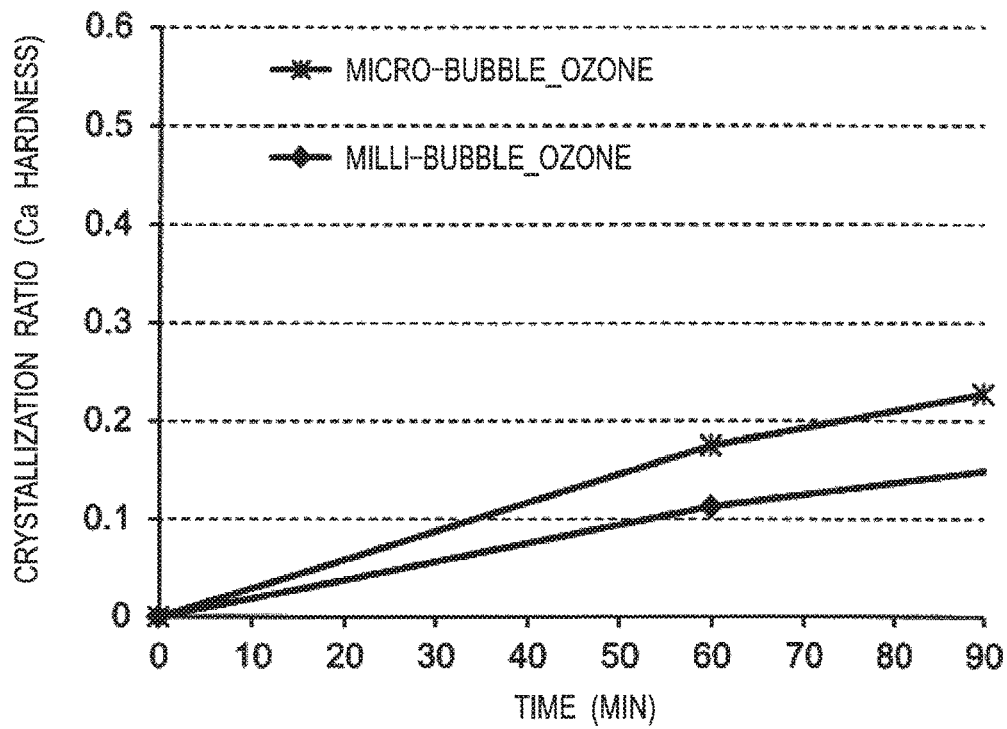
FIG. 17A presents a diagram showing results of example 6 (Ca hardness).
Figure 17B:
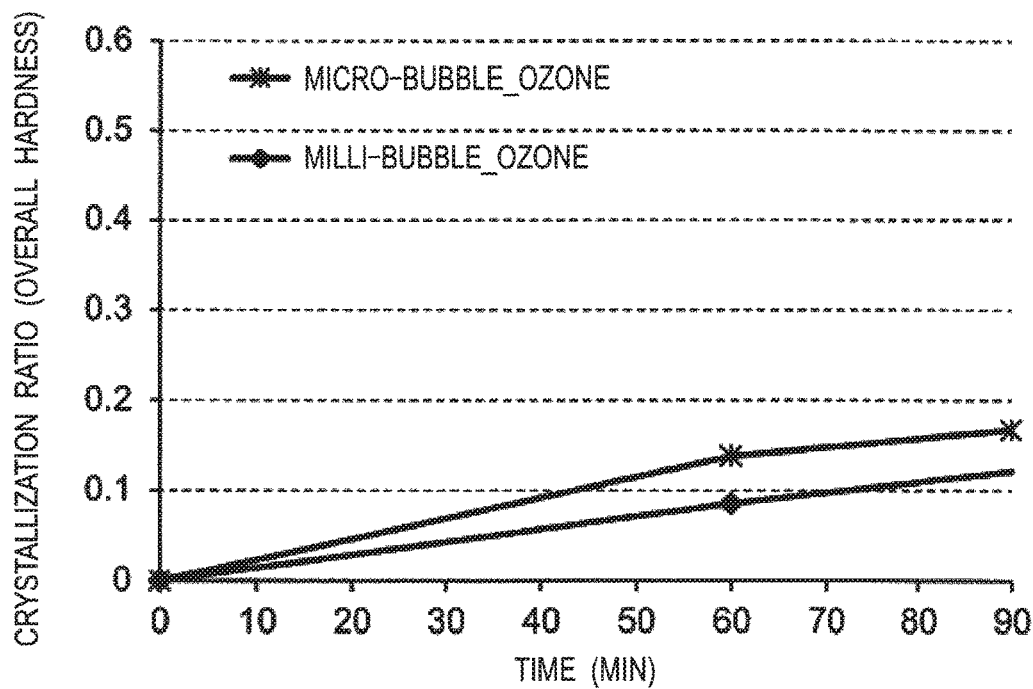
FIG. 17B presents a diagram showing results of example 6 (overall hardness).

FIG. 17A and FIG. 17B present experimental results in example 6.

In FIG. 17A, the abscissa represents time (minute), and the ordinate represents the crystallization ratio (%) of the Ca hardness. In FIG. 17B, the abscissa represents time (minute), and the ordinate represents the crystallization ratio (%) of the overall hardness.

FIG. 17A and FIG. 17B reveal that both the Ca hardness and the overall hardness of the micro-bubbles achieve higher crystallization ratios than of the milli-bubbles. That is, it was demonstrated that the case using the micro-bubbles as fine bubbles had a higher crystallization ratio and a higher metal ion crystallization effect with fine bubbles than those in the case using the milli-bubbles as non-fine bubbles.

As described above, although having explained the present invention with reference to the embodiments, the present invention is not limited to the embodiments. For example, in embodiments 1 and 2, although having explained the case of the ion removal device 2 having the configuration shown in FIG. 1, the present invention is not limited to such a case. Any configuration may be adopted as long as the configuration includes the fine bubble generation means 6 for generating fine bubbles and can supply the generated fine bubbles into hard water.

Additionally, in embodiments 1 and 2, although having explained the case where the metal components precipitated by crystallizing the metal ions attached to the surfaces of the fine bubbles are separated by centrifugation in the treatment tank 8, the present invention is not limited to such a case. For example, the metal components in the state of the metal ions may be removed from hard water by discharging the fine bubbles ascending in the treatment tank 8 while the metal ions are adsorbed to the fine bubbles. Alternatively, the metal components in the state of the metal ions may be removed from hard water by carrying out centrifugation while the metal ions are adsorbed to the fine bubbles to gather bubbles having low specific gravities in the center, and collecting the bubbles. In this manner, by discharging the fine bubbles adsorbing the metal ions from hard water, the hardness of hard water can be decreased to produce soft water even in the method of removing the metal ions from hard water. The metal ions can be removed from hard water in a short time as compared with the case where the metal ions are precipitated as crystals and separated.

Additionally, in embodiments 1 and 2, although having explained the case of the water-softening device in which the ion removal device 2 softens hard water, the present invention is not limited to such a case. Hard water is not necessarily softened as long as the number of the metal ions in hard water can be reduced to lower the hardness of hard water.

Additionally, in embodiments 1 and 2, although having explained the case of the ion removal device 2 including the separation means 10, the present invention is not limited to such a case, and a case including no separation means 10 is allowed. Although having explained the case where the separation means 10 is composed of the end portion 4a of the hard water supply pipe 4 and the adsorption plates 11, the present invention is not limited to such a case, and any configuration may be adopted as long as the metal ions and the metal components can be separated from hard water.

Additionally, in embodiments 1 and 2, although having explained the case where the end portion 4a of the hard water supply pipe 4 discharges water in a direction eccentric from the central axis of the treatment tank 8 to generate a swirling flow in the liquid discharged to the treatment layer 8, the present invention is not limited to such a case. Any swirling flow generation means may be adopted, e.g. a rotary spring driven by a motor is disposed below the treatment tank 8, and the rotary spring is rotated to forcibly generate the swirling flow in the treatment tank 8.

Additionally, in embodiments 1 and 2, although having expressed the case of generating the fine bubbles using air or nitrogen in the water-softening treatment, the present invention is not limited to such a case, and the fine bubbles may also be generated using a gas other than air and nitrogen.

Additionally, in embodiments 1 and 2, although having expressed the case of generating the fine bubbles using carbon dioxide in the regeneration treatment, the present invention is not limited to such a case, and the fine bubbles may also be generated using a gas (e.g. hydrogen sulfide, hydrogen chloride, etc.) other than carbon dioxide. Alternatively, the regeneration treatment may be carried out using not only the gas but also a liquid. For example, the regeneration treatment can also be carried out by supplying hydrochloric acid, sulfuric acid, citric acid, ascorbic acid or the like to the treatment tank 8.

Additionally, in embodiments 1 and 2, although having explained the case of supplying only the fine bubbles into hard water, the present invention is not limited to such a case, and another gas may be further added in addition to the fine bubbles. The other gas may be supplied as fine bubbles, or otherwise as normal bubbles other than the fine bubbles.

Additionally, in embodiment 3, although having expressed a case using the fine bubbles including the mixed two gases, the first gas as a basic gas and the second gas having a slower solution velocity than of the first gas, another gas may be mixed in addition to these two gases. That is, the fine bubbles with a mixture gas of two or more types of gases including the first and second gases may be used.

Incidentally, among the various embodiments and variations, any embodiments can be appropriately combined to exhibit each effect of each embodiment.

The present disclosure has been sufficiently described in connection with the preferable embodiments with reference to the appended drawings, but various variations and modifications are obvious to those skilled in the art. Such variations and modifications should be understood as included within the scope of the present disclosure according to the appended claims without departing from the scope. In addition, changes in the combination or the order of the elements in each embodiment can be achieved without departing from the scope and the spirit of the present disclosure.

INDUSTRIAL APPLICABILITY

The present invention can be applied to any ion removal device.

DESCRIPTION OF REFERENCE SIGNS

2 Ion removal device
4 Hard water supply pipe (hard water storage section)
4a End portion
6 Fine bubble generation means
8 Treatment tank (hard water storage section)
10 Separation means
11 Adsorption plates
12 Soft water drawing pipe
14 Separated water discharging pipe
20 Device
21 Hard water
22 Water tank (hard water storage section)
22a Bottom face
22b Water surface
24 Gas supply section
25 First pipe
26 Fine bubble generation section
27 Second pipe
28 Pump
30 First water intake section
32 Second water intake section
34 Metal ion concentration detector
40 Fine bubble
42 Crystal
D1 Distance from the first water intake section to the second water intake section
50 Device
52 Mixture gas supply section
54 Treatment tank (hard water storage section)
56 First pipe
58 Second pipe
60 Water collection valve
62 Water collector
64 Water storage tank
66 Pump
68 Flow regulation valve
70 Flowmeter
72 Ammonia supply source
74 Nitrogen supply source
76 Mixing ratio regulation valve
78 Supply pipe
80 Fine bubble supply section 82 Treated water
84 Crystal

The invention claimed is:

1. An ion removal device comprising:
   a hard water storage section configured to store hard water; and
   a fine bubble generation means configured to generate fine bubbles and supplying the bubbles to the hard water storage section,
   wherein, in the hard water storage section, metal ions in the hard water are adsorbed to the fine bubbles to be removed from the hard water,
   wherein the metal ions adsorbed to the fine bubbles are crystallized and precipitated in the hard water storage section, and
   further comprising a separation means configured to separate the crystallized and precipitated crystal in the hard water storage section.

2. The ion removal device according claim 1, wherein, in the hard water storage section, the metal ions are removed from the hard water by discharge of the fine bubbles adsorbing the metal ions from the hard water.

3. An ion removal device comprising:
   a hard water storage section configured to store hard water; and
   a fine bubble generation means configured to generate fine bubbles and supplying the bubbles to the hard water storage section,
   wherein, in the hard water storage section, metal ions in the hard water are adsorbed to the fine bubbles to be removed from the hard water,
   wherein the fine bubble generation means is configured to generate the fine bubbles with a mixture gas of a first gas and a second gas, and wherein the first gas is a hydroxyl ion-donating gas configured to react with water to donate hydroxyl ions and the second gas has a slower solution velocity than that of the first gas,
   wherein a mixing ratio of the first gas in the mixture gas is higher than that of the second gas, and
   wherein the mixing ratio of the first gas in the mixture gas is 70% or higher.

4. The ion removal device according to claim 3, wherein the first gas is a soluble basic gas.

5. The ion removal device according to claim 4, wherein the first gas is ammonia and the second gas is nitrogen.

6. An ion removal device comprising:
   a hard water storage section configured to store hard water; and
   a fine bubble generation means configured to generate fine bubbles and supplying the bubbles to the hard water storage section,
   wherein, in the hard water storage section, metal ions in the hard water are adsorbed to the fine bubbles to be removed from the hard water, and
   further comprising a carbon dioxide gas generation means for generating carbon dioxide gas, wherein the carbon dioxide gas generated by the carbon dioxide gas generation means is supplied to the hard water storage section before the supply of the fine bubbles generated by the fine bubble generation means to the hard water storage section.

7. The ion removal device according to claim 1, wherein the fine bubble generation means incorporates air to generate the fine bubbles.

8. The ion removal device according to claim 1, wherein the fine bubble generation means incorporates a gas other than air to generate the fine bubbles.

9. The ion removal device according to claim 8, wherein the fine bubble generation means incorporates nitrogen to generate the fine bubbles.

10. The ion removal device according to claim 1, wherein, after the metal ions are removed from the hard water, the fine bubble generation means supplies fine carbon dioxide bubbles to the hard water storage section for performing regeneration treatment.

11. An ion removal method comprising:
    a generation step of generating fine bubbles; and
    a first supply step of supplying the generated fine bubbles to hard water, wherein, in the first supply step, the metal ions in the hard water are adsorbed to the fine bubbles to be removed from the hard water,
    wherein the fine bubbles generated in the generation step is a mixture gas of the first gas and the second gas, and wherein the first gas is a hydroxyl ion-donating gas for reacting with water to donate the hydroxyl ions and the second gas has a slower solution velocity than that of the first gas,
    wherein a mixing ratio of the first gas in the mixture gas is higher than that of the second gas, and
    wherein the mixing ratio of the first gas in the mixture gas is set to 70% or higher.

12. The ion removal method according to claim 11, wherein the metal ions adsorbed to the fine bubbles in the first supply step are crystallized and precipitated.

13. The ion removal method according to claim 12, further comprising a separation step of separating the crystallized and precipitated crystal.

14. The ion removal method according to claim 11, further comprising a discharge step of discharging the fine bubbles adsorbing the metal ions in the first supply step from the hard water, thereby removing the metal ions from the hard water.

15. The ion removal method according to claim 11, wherein the first gas is a soluble basic gas.

16. The ion removal method according to claim 15, wherein the first gas is ammonia and the second gas is nitrogen.

17. An ion removal method comprising:
    a generation step of generating fine bubbles; and
    a first supply step of supplying the generated fine bubbles to hard water,
    wherein, in the first supply step, the metal ions in the hard water are adsorbed to the fine bubbles to be removed from the hard water, and
    further comprising a second supply step of generating carbon dioxide gas to be supplied to the hard water before the first supply step.

18. The ion removal method according to claim 11, wherein the fine bubbles are generated from air in the generation step.

19. The ion removal method according to claim 11, wherein the fine bubbles are generated from a gas other than air in the generation step.

20. The ion removal method according to claim 19, wherein fine bubbles are generated from nitrogen in the generation step.

21. The ion removal method according to claim 11, further comprising a regeneration step to perform regeneration treatment by supplying fine carbon dioxide bubbles after the metal ions are removed from the hard water in the first supply step.

* * * * *